(12) United States Patent
Rao et al.

(10) Patent No.: US 9,361,384 B2
(45) Date of Patent: Jun. 7, 2016

(54) IMAGE EXTRACTION SERVICE FOR QUESTION AND ANSWER SEARCH ENGINE

(71) Applicant: IAC Search & Media, Inc., Oakland, CA (US)

(72) Inventors: Vaijanath N. Rao, Sausalito, CA (US); Bhawna Singh, Fremont, CA (US)

(73) Assignee: IAC Search & Media, Inc., Oakland, CA (US)

( * ) Notice: Subject to any disclaimer, the term of this patent is extended or adjusted under 35 U.S.C. 154(b) by 154 days.

(21) Appl. No.: 14/141,361

(22) Filed: Dec. 26, 2013

(65) Prior Publication Data

US 2015/0186526 A1 Jul. 2, 2015

(51) Int. Cl.
G06F 17/30 (2006.01)
G06N 5/04 (2006.01)

(52) U.S. Cl.
CPC .... G06F 17/30867 (2013.01); G06F 17/30247 (2013.01); G06F 17/30321 (2013.01); G06F 17/30575 (2013.01); G06N 5/04 (2013.01)

(58) Field of Classification Search
USPC .......................... 707/609, 687, 707, 790, 791
See application file for complete search history.

(56) References Cited

U.S. PATENT DOCUMENTS

| | | |
|---|---|---|
| 2001/0032211 A1 | 10/2001 | Kuzumaki |
| 2002/0119433 A1 | 8/2002 | Callender |
| 2006/0235689 A1 | 10/2006 | Sugihara et al. |
| 2008/0235005 A1* | 9/2008 | Golan .................. H04L 67/306 704/9 |
| 2011/0125734 A1 | 5/2011 | Duboue et al. |
| 2012/0101807 A1 | 4/2012 | Heo et al. |
| 2012/0191716 A1* | 7/2012 | Omoigui ............. H01L 27/1463 707/740 |
| 2014/0053206 A1* | 2/2014 | Shoykher ................. H04N 5/44 725/50 |
| 2014/0075004 A1* | 3/2014 | Van Dusen ............. H04L 41/04 709/223 |
| 2015/0186514 A1* | 7/2015 | Singh ................ G06F 17/30864 707/709 |
| 2015/0186515 A1 | 7/2015 | Rao et al. |
| 2015/0186526 A1 | 7/2015 | Rao et al. |
| 2015/0186527 A1 | 7/2015 | Rao et al. |

* cited by examiner

*Primary Examiner* — Sana Al Hashemi
(74) *Attorney, Agent, or Firm* — Baker & Hostetler LLP

(57) ABSTRACT

A question and answer system for providing results to requests comprising an online system and an offline system. The offline system includes a file system, a hierarchical database and an index controller having at least one reducer that retrieves content from the file system and at least one writer that maintains the data store with the content retrieved by the reducer, and maintains the hierarchical database with data reflecting the content in the data store. The offline system includes an image queue, an index controller that updates the image queue with data representing content in the data store that include images, an image extraction service having a thumbnailer generating thumbnails for the images, an uploader and at least one static image server, the uploader uploading the thumbnails and images to the static image server.

10 Claims, 21 Drawing Sheets

| Question Sub types | |
|---|---|
| SubClass-A | About subjects, objects, manner, time or location |
| SubClass-B | About properties or attributes |
| SubClass-C | Taxonomic nature |

FIG 15

| Answer Types | |
|---|---|
| ABBREVIATION | abbreviation |
| ENTITY | body organs, currency, author, person |
| DESCRIPTION | description and abstract concepts |
| HUMAN | human beings |
| LOCATION | locations |
| NUMERIC | numeric values |

FIG 16

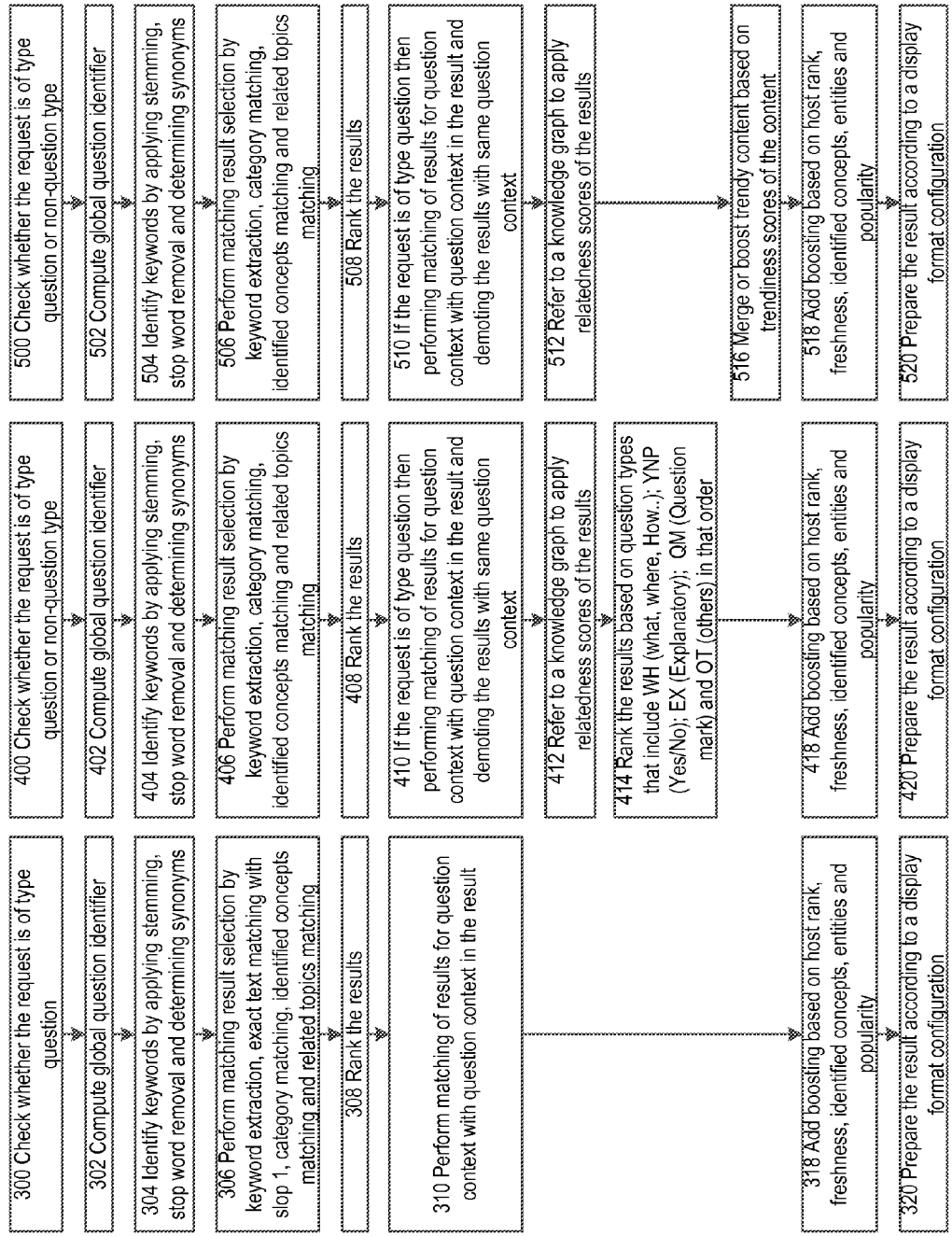

IMAGE EXTRACTION SERVICE FOR QUESTION AND ANSWER SEARCH ENGINE

BACKGROUND OF THE INVENTION

1). Field of the Invention

This invention relates to a question and answer system for providing results to requests.

2). Discussion of Related Art

Search engines are often used to identify remote websites that may be of interest to a user. A user at a user computer system types a request into a user interface and transmits the request to the search engine. The search engine has a data store that holds content regarding the remote websites. The search engine obtains the content of the remote websites by periodically crawling the Internet. The data store of the search engine includes a corpus of documents that can be used for results that the search engine then transmits back to the user computer system in response to the request.

It has become common for users to request answers to questions. Regular search engines are not suitable for providing answers to questions. The online system of a search engine typically does not have the architecture that allows for quick processing of questions and extraction of answers. A crawler of a regular search engine crawls data from arbitrary websites that do not necessarily relate to questions that are being answered. Certain questions may also be updated faster than others. Not being able to process what a question means or of what type the question is also makes regular search engines ineffective for providing answers to questions.

SUMMARY OF THE INVENTION

The invention generally relates to a question and answer system for providing results to requests and includes an online system and an offline system. The online system includes at least one data store, a question and answer search engine that receives a request from a user computer system, determines a result from the data store based on the request and returns the answer to the user computer system. The offline system includes a file system, a hierarchical database and an index controller having at least one reducer that retrieves content from the file system and at least one writer that maintains the data store with the content retrieved by the reducer, and maintains the hierarchical database with data reflecting the content in the data store.

The online system may also include a load balancer that receives the request from the user computer system, a plurality of front end systems that receive the requests from the load balancer, including the request from the user computer system, an aggregator and a plurality of retrievers, the aggregator being connected to the front end systems and to the retrievers, the request passing from a respective front end system via the aggregator to at least a first of the retrievers, the first retriever returning a result via the aggregator and the respective front end system to the user computer system in response to the request.

The request may pass from the respective front end system via the aggregator to at least a second of the retrievers, the second retriever returning a result via the aggregator and the respective front end system to the user computer system in response to the request.

The aggregator may aggregate the results received from the first and second retrievers.

The online system may also include a cache forming part of the load balancer, wherein the front end system checks whether a cached result is available in the cache, wherein if a cached result is available then the front end system retrieves the cached result, the cached result being the result that is returned, and if a cached result is not available then the front end system processes result extraction to obtain at least one processed result, the processed result being the result that is returned, and updates the cache with the processed result.

The online system may also include a metaservice holding a plurality of global question identifiers, wherein the result extraction includes translating parameters of the request into data parameters suitable for determining the answer from the data store, determining a selected one of a plurality of modes based on the request, filling in data parameters defined for the selected mode, removing common words, requesting a global question identifier from the metaservice, processing pre request blocking, blocking of answers based on text of the request and the global question identifier, requesting the aggregator to provide search results, processing post request blocking, processing results for field collapsing
retaining a maximum of predetermined number of results for each field value, removing duplicate results in the form of question and answer pairs that have exactly the same question and answer and normalizing scores of the results to a common scale.

The front end system may process post request blocking if the cached result is available.

The offline system may include a crawler that connects over the Internet to remote computer systems to retrieve data that is placed in the file system.

The offline system may also include a batch update crawl cluster that includes a crawl database within the file system, a map reducer within the index controller, the map reducer having a reducer core with a plurality of slow queues that retrieve the content from the crawl database, and a reducer adapter that writes an output of the reducer core into the hierarchical database.

The offline system may also include a fast update crawl cluster that includes a crawl database within the file system and a map reducer within the index controller, the map reducer having a reducer core with a plurality of fast queues that retrieve the content from the crawl database at a faster frequency than the slow queues, and a reducer adapter that writes an output of the reducer core into the hierarchical database.

The offline system may also include may also include a fresh crawl cluster that includes at least a first node having a list of seed uniform resource locators, a fresh crawler that retrieves data over the internet based on the uniform resource locators, a storage segment for storing the data retrieved by the fresh crawler, and fresh crawler adapter that writes an output of the fresh crawler placed in the storage segment into the hierarchical database.

The offline system may include that the fresh crawl cluster further includes at least a second node having a list of seed uniform resource locators, a fresh crawler that retrieves data over the internet based on the uniform resource locators, a storage segment for storing the data retrieved by the fresh crawler, and fresh crawler adapter that writes an output of the fresh crawler placed in the storage segment into the hierarchical database.

The offline system may include an image queue, the index controller updating the image queue with data representing content in the data store that include images, an image extraction service having a queue manager, worker threads that are created by the queue manager based on the content in the image queue, downloader threads that are created based on downloadable data in the worker threads, a thumbnailer generating thumbnails for the images, an uploader and at least one static image server, the uploader uploading the thumbnails and images to the static image server.

The offline system may include at least one data store, the writer of the index controller writing to the data store of the offline system and the data store of the online system synchronizing with the data store of the offline system.

The offline system may include a question and answer extraction module extracting question and answer pairs from the hierarchical database and a question type detector determining a type of question for each question in the question and answer pairs, wherein the index controller indexes question and answer pairs based on the question type.

The offline system may include that the question and answer extraction module forwards extracted question text to the question type detector, the question type detector determining the type of question based on the extracted question text.

The offline system may include that the question and answer extraction module forwards an answer list, reference links and metadata to the index controller, the question type detector forwards a question list and the question type to the index controller and the index controller combines data received from the question and answer extraction module and data received from the question type detector.

The offline system may include a plurality of question and answer extraction modules, each generating a respective set of question and answer pairs according to a respective methodology the methodology being different for each question and answer extraction module, and a question refinement component refining questions of the sets of question and answer pairs, the question and answer pairs being created by the question refinement component from the sets of question and answer pairs from the plurality of question and answer modules.

The offline system may include that the plurality of question and answer modules include at least two, and preferably three or more, of a template based extraction module, a microformat extraction module, an internal link frequently asked questions extraction module, a text based frequently asked questions extraction module, a forum extraction module, a title content extraction module, a list extraction module and Hypertext Markup Language (HTML) tag extraction module.

The offline system may include that the question and answer extraction module is a template based extraction module, further including a site template configuration executable to determine a configuration and a library with the configuration based on the site template configuration, wherein the template based extraction module uses the configuration in the library.

The offline system may include that the question type detector includes a sentence splitter that receives question text of the respective question from the question and answer extraction module and splits the sentence into component parts, a stop words filter that removes stop words from the component parts and produces a question of unknown type from the component parts after the stop words have been removed and a plurality of question type determinators, each being challenged to determine the question type of the question of unknown type according to a separate methodology.

The offline system may include that the question type determinators include at least one of a question mark based determinator, a yes or no positive question type determinator, a yes or no negative question type determinator, and an explanatory question type determinator.

The online system may include a request type determinator determining a type of the request and a plurality of answer mode modules that are executed based on the request type.

The selected answer mode module may be a question mode module that executes a method including checking whether the request is of type question, computing global question identifier, identifying keywords by applying stemming, stop word removal and determining synonyms, performing matching result selection by keyword extraction, exact text matching with slop 1, category matching, identified concepts matching and related topics matching, ranking the results, performing matching of results for question context with question context in the request, adding boosting based on host rank, freshness, identified concepts, entities and popularity and preparing the result according to a display format configuration.

The selected answer mode module may be a related question mode module that executes a method including checking whether the request is of type question or non-question type, computing a global question identifier, identifying keywords by applying stemming, stop word removal and determining synonyms, performing matching result selection by keyword extraction, category matching, identified concepts matching and related topics matching, ranking the results, if the request is of type question then performing matching of results for question context with question context in the request and demoting the results with same question context, referring to a knowledge graph to apply relatedness scores of the results, ranking the results based on question types that include WH (what, where, How . . . ); YNP (Yes/No); EX (Explanatory); QM (Question mark) and OT (others) in that order, adding boosting based on host rank, freshness, identified concepts, entities and popularity and preparing the result according to a display format configuration.

The selected answer mode module is a popular question and answer mode module that executes a method including checking whether the request is of type question or non-question type computing a global question identifier, identifying keywords by applying stemming, stop word removal and determining synonyms, performing matching result selection by keyword extraction, category matching, identified concepts matching and related topics matching, ranking the results, if the request is of type question then performing matching of results for question context with question context in the request and demoting the results with same question context, referring to a knowledge graph to apply relatedness scores of the results, merging or boosting trendy content based on trendiness scores of the content, adding boosting based on host rank, freshness, identified concepts, entities and popularity and preparing the result according to a display format configuration.

The invention also provides a method for providing results to requests including receiving, with a question and answer search engine of an online system, a request from a user computer system, determining, with the question and answer search engine, a result from a data store of the online system based on the request and returns the answer to the user computer system, returning, with the question and answer search engine, the answer to the user computer system, retrieving, with at least one reducer of an index controller of an offline system, content from a file system of the offline system and maintaining, with at least one writer of the index controller, the data store with the content retrieved by the reducer, and the hierarchical database with data reflecting the content in the data store.

The method may further include receiving the request from the user computer system at a load balancer of the question and answer search engine, receiving requests at a plurality of front end systems of the question and answer search engine from the load balancer, including the request from the user computer system, passing the request from a respective front end system via an aggregator of the question and answer search engine, the aggregator being connected to the front end systems and to the retrievers, to at least a first of the retrievers, the first retriever returning a result via the aggregator and the respective front end system to the user computer system in response to the request and returning a result from the respective retriever via the aggregator and the respective front end system to the user computer system in response to the request.

The method may further include that the request passes from the respective front end system via the aggregator to at least a second of the retrievers, the second retriever returning a result via the aggregator and the respective front end system to the user computer system in response to the request.

The method may further include aggregating, with the aggregator, the results received from the first and second retrievers.

The method may further include checking whether a cached result is available in a cache of the load balancer, if a cached result is available then retrieving the cached result, the cached result being the result that is returned, and if a cached result is not available then processing result extraction to obtain at least one processed result, the processed result being the result that is returned and updating the cache with the processed result.

The method may further include that the result extraction includes translating parameters of the request into data parameters suitable for determining the answer from the data store, determining a selected one of a plurality of modes based on the request, filling in data parameters defined for the selected mode, removing common words, requesting a global question identifier from a metaservice, processing pre request blocking, blocking of answers based on text of the request and the global question identifier, requesting the aggregator to provide search results, processing post request blocking, processing results for field collapsing, retaining a maximum of predetermined number of results for each field value, removing duplicate results in the form of question and answer pairs that have exactly the same question and answer and normalizing scores of the results to a common scale.

The method may further include processing post request blocking if the cached result is available.

The method may further include retrieving, with a crawler of the offline system that connects over the Internet to remote computer systems, data that is placed in the file system.

The method may further include retrieving the content from a crawl database of a batch update crawl cluster within a file system of the batch update crawl cluster, the content being retrieved with a map reducer of the batch update crawl cluster within the index controller, the map reducer of the batch update crawl cluster having a reducer core with a plurality of slow queues that retrieve the content from the crawl database, and a reducer adapter that writes an output of the reducer core into the hierarchical database.

The method may further include retrieving the content from a crawl database of a fast update crawl cluster within a file system of the fast update crawl cluster, the content being retrieved with a map reducer of the fast update crawl cluster within the index controller, the map reducer of the fast update crawl cluster having a reducer core with a plurality of slow queues that retrieve the content from the crawl database at a faster frequency than the slow queues, and a reducer adapter that writes an output of the reducer core into the hierarchical database.

The method may further include storing a fresh crawl cluster that includes at least a first node having a list of seed uniform resource locators, a fresh crawler, a storage segment, and fresh crawler adapter that writes an output of the fresh crawler placed in the storage segment into the hierarchical database, retrieving data over the internet based on the uniform resource locators of the first node, storing the data retrieved by the fresh crawler of the first node in the storage segment of the first node, and writing, with the fresh crawler adapter of the first node, an output of the fresh crawler of the first node placed in the storage segment of the first node into the hierarchical database.

The method may further include storing at least a second node as part of the fresh crawl cluster, the second node having a list of seed uniform resource locators, a fresh crawler, a storage segment, and fresh crawler adapter that writes an output of the fresh crawler placed in the storage segment into the hierarchical database, retrieving data over the internet based on the uniform resource locators of the second node, storing the data retrieved by the fresh crawler of the second node in the storage segment of the second node and writing, with the fresh crawler adapter of the second node, an output of the fresh crawler of the second node placed in the storage segment of the second node into the hierarchical database.

The method may further include updating, with the index controller, an image queue of the offline system with data representing content in the data store that include images, creating, with a queue manager of an image extraction service forming part of the offline system, worker threads based on the content in the image queue, creating downloader threads based on downloadable data in the worker threads, generating, with a thumbnailer of the image extraction service, thumbnails for the images and uploading, with an uploader of the image extraction service, at least one static image server the thumbnails and images to at least one static image server.

The method may further include writing, with the writer of the index controller, data to at least one data store of the offline system and synchronizing the data store of the online system with the data store of the offline system.

The method may further include extracting, with a question and answer extraction module forming part of the offline system, question and answer pairs from the hierarchical database and determining, with a question type detector forming part of the offline system, a type of question for each question in the question and answer pairs, wherein the index controller indexes question and answer pairs based on the question type.

The method may further include forwarding, with the question and answer extraction module, extracted question text to the question type detector, the question type detector determining the type of question based on the extracted question text.

The method may further include forwarding, with the question and answer extraction module, an answer list, reference links and metadata to the index controller, forwarding, with the question type detector, a question list and the question type to the index controller and combining, with the index controller, data received from the question and answer extraction module and data received from the question type detector.

The method may further include generating, with each of a plurality of question and answer extraction modules, question and answer pairs according to a respective methodology, the methodology being different for each question and answer extraction module and refining, with a question refinement component, questions of the sets of question and answer pairs, the question and answer pairs being created by the question refinement component from the sets of question and answer pairs from the plurality of question and answer modules.

The plurality of question and answer modules may include at least two, and preferably three or more, of a template based extraction module, a microformat extraction module, an internal link frequently asked questions extraction module, a text based frequently asked questions extraction module, a forum extraction module, a title content extraction module, a list extraction module and Hypertext Markup Language (HTML) tag extraction module.

The question and answer extraction module may be a template based extraction module, the method further including executing a site template configuration to determine a configuration and storing a library with the configuration based on the site template configuration, wherein the template based extraction module uses the configuration in the library.

The method may further include that the determination of the type of question includes receiving, with a question splitter forming part of the question type detector, question text of the respective question from the question and answer extraction module, splitting, with the sentence splitter, the sentence into component parts, removing, with a stop words filter forming part of the question type detector, stop words from the component parts and produces a question of unknown type from the component parts after the stop words have been removed, producing, with a stop words filter a question of unknown type from the component parts after the stop words have been removed, challenging each of a plurality of question type determinators to determine the question type of the question of unknown type according to a separate methodology, a plurality of question type determinators, each being challenged to determine a the question type according to a separate methodology.

The question type determinators may include at least one of a question mark based determinator, a yes or no positive question type determinator, a yes or no negative question type determinator, and an explanatory question type determinator.

The method may further include determining, with a request type detection module of the online system, a type of the request, and executing one or more of a plurality of answer mode modules based on the request type.

The selected answer mode module may be a question mode module that executes a method including, checking whether the request is of type question, computing a global question identifier, identifying keywords by applying stemming, stop word removal and determining synonyms, performing matching result selection by keyword extraction, exact text matching with slop 1, category matching, identified concepts matching and related topics matching, ranking the results, performing matching of results for question context with question context in the request, adding boosting based on host rank, freshness, identified concepts, entities and popularity and preparing the result according to a display format configuration.

The selected answer mode module may be a related question mode module that executes a method including checking whether the request is of type question or non-question type, computing global question identifier, identifying keywords by applying stemming, stop word removal and determining synonyms, performing matching result selection by keyword extraction, category matching, identified concepts matching and related topics matching, ranking the results, if the request is of type question then performing matching of results for question context with question context in the request and demoting the results with same question context, referring to a knowledge graph to apply relatedness scores of the results, ranking the results based on question types that include WH (what, where, How . . . ); YNP (Yes/No); EX (Explanatory); QM (Question mark) and OT (others) in that order, adding boosting based on host rank, freshness, identified concepts, entities and popularity and preparing the result according to a display format configuration.

The selected answer mode module may be a popular question and answer mode module that executes a method including checking whether the request is of type question or non-question type, computing global question identifier, identifying keywords by applying stemming, stop word removal and determining synonyms, performing matching result selection by keyword extraction, category matching, identified concepts matching and related topics matching, ranking the results, if the request is of type question then performing matching of results for question context with question context in the request and demoting the results with same question context, referring to a knowledge graph to apply relatedness scores of the results, merging or boosting trendy content based on trendiness scores of the content, adding boosting based on host rank, freshness, identified concepts, entities and popularity and preparing the result according to a display format configuration.

BRIEF DESCRIPTION OF THE DRAWINGS

The invention is further described by way of example with reference to the accompanying drawings, wherein:

FIG. 15 is a table that illustrates question subtypes that are determined by the question and answer extraction service;

FIG. 16 is a table of various answer types that are determined by the question and answer type extraction service;

FIG. 18 is a flow chart illustrating functioning of a question mode module;

FIG. 19 is a flow chart illustrating functioning of a related question mode module;

FIG. 20 is a flow chart illustrating functioning of a popular question and answer mode module.

DETAILED DESCRIPTION OF THE INVENTION

Figure 1:
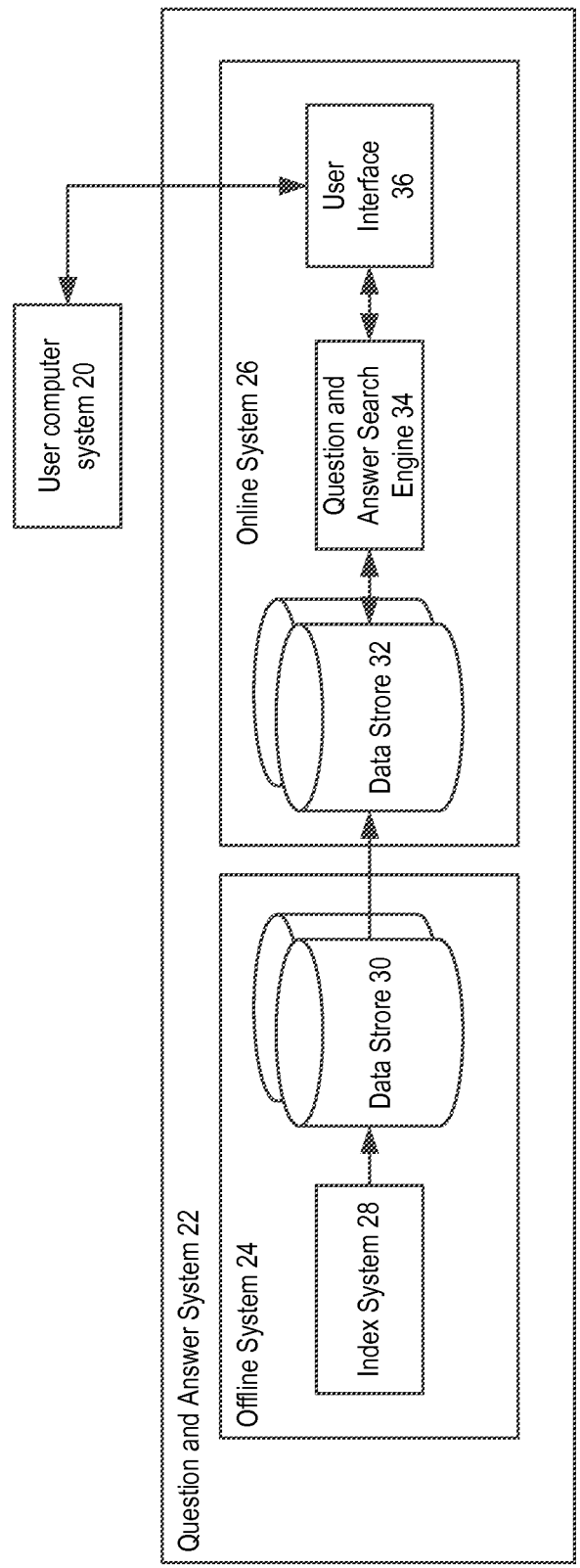
FIG. 1 is a block diagram of a question and answer system for providing results to requests from a user computer system.

FIG. 1 of the accompanying drawings illustrates a user computer system 20 and a question and answer system 22 for providing results to request. The question and answer system 22 includes an offline system 24 and an online system 26.

The offline system 24 includes an index system 28 and a plurality of data stores 30 connected to the index system 28. The online system 26 includes a plurality of data stores 32 that are connected to the data stores 30, a question and answer search engine 34 connected to the data stores 32 and a user interface 36 connected to the question and answer search engine 34.

In use, a user at the user computer system 20 enters a Uniform Resource Locator (URL) for the online system 26 and downloads the user interface 36 onto a display of the user computer system 20. The user interface 36 includes a field for the user to enter a request. The user can then transmit the request from the user computer system 20 to the online system 26. The question and answer search engine 34 receives the request from the user computer system 20, determines an answer from one or more of the data stores 32 based on the request and returns the answer to the user computer system 20. The user can then view the answer within the user interface 36 on the user computer system 20.

Figure 2:
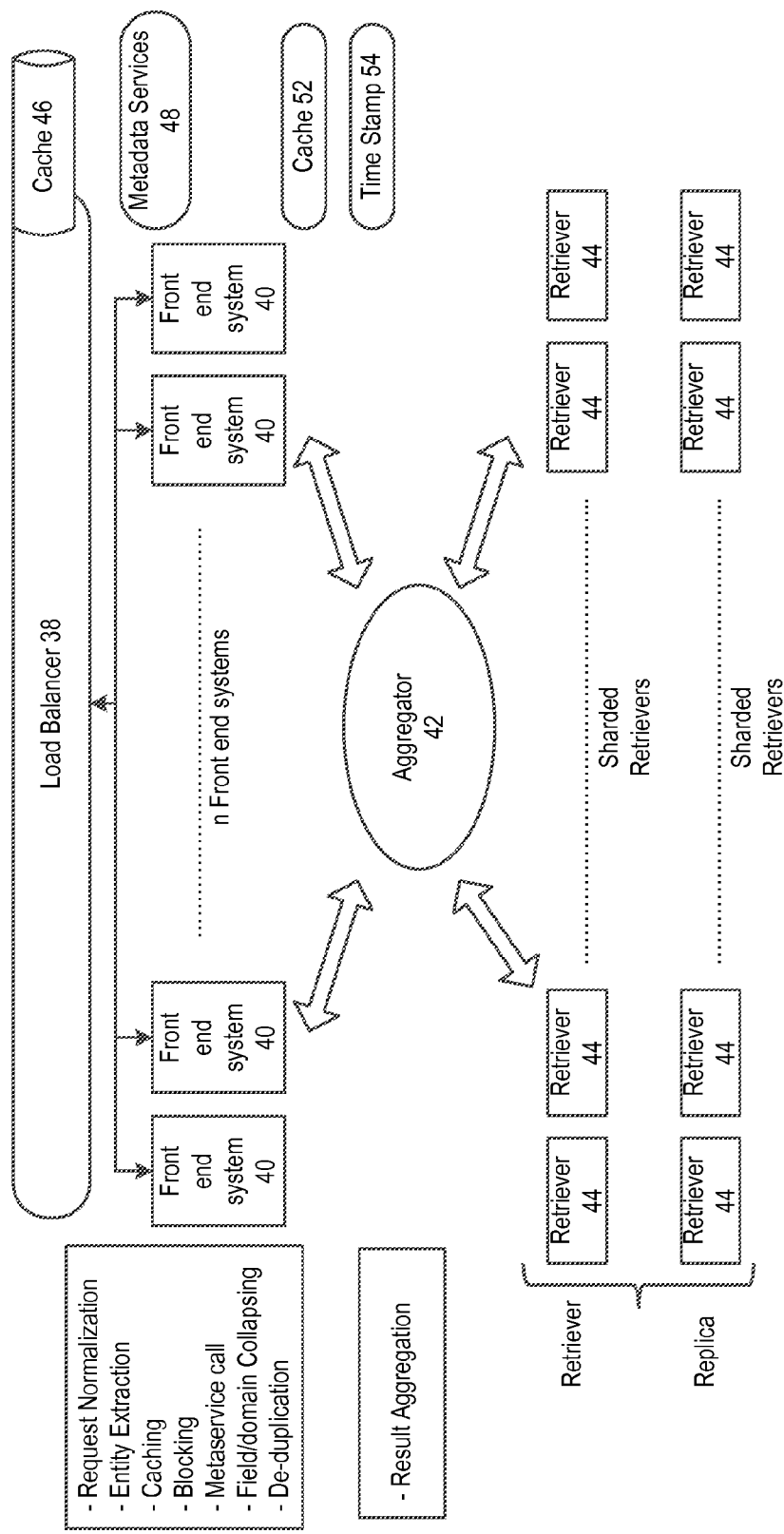
FIG. 2 is a block diagram of a question and answer search engine forming part of the question and answer system.

As shown in FIG. 2, the question and answer search engine 34 includes a load balancer 38, a plurality of front end systems 40, an aggregator 42, a plurality of retrievers 44, a cache 46 forming part of the load balancer and, forming part of the front end systems 40, a metadata services 48, a cache 52 and a time stamp 54.

The load balancer 38 receives the request from the user computer system 20 in FIG. 1. The front end systems 40, in general, receive requests from the load balancer 38. The load balancer 38 selects one of the front end systems 40 (hereinafter "the selected front end system 40") and passes the request received from the user computer system 20 on to the selected front end system 40.

The aggregator 42 is connected to the front end systems 40 and to the retrievers 44. The request passes from the selected front end system 40 via the aggregator 42 in parallel to all the retrievers 44 in one set, and therefore to at least a first of the retrievers 44. The first retriever 44 returns a result via the aggregator 42, the respective front end system 40 and the load balancer 38 to the user computer system 20 in response to the request. The request also passes from the selected front end system 40 via the aggregator 42 to at least a second of the retrievers 44. The second retriever 44 returns a result via the aggregator 42, the selected front end system 40 and the load balancer 38 to the user computer system 20 in response to the request. The aggregator 42 aggregates the results received from the first and second retrievers 44. Aggregation typically involves the placement of the results of the first and second retrievers 44 on one page before passing the page on to the selected front end system 40.

Figure 2A:
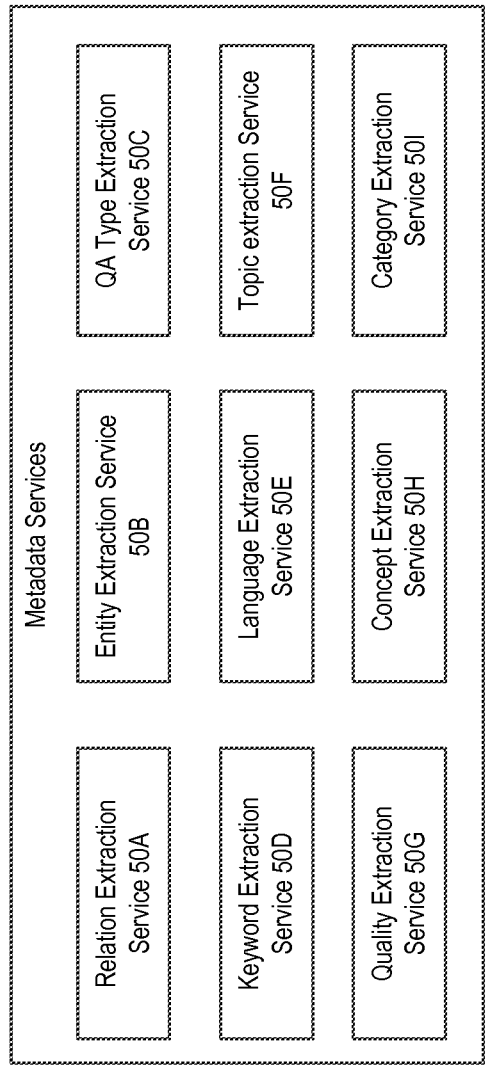
FIG. 2A is a block diagram illustrating various metadata services.

By placing the aggregator 42 in a position where it communicates with a plurality of front end systems 40 and a plurality of retrievers 44, the architecture allows for upward scaling without necessarily increasing the number of aggregators, the aggregator 42 is also configured to control data flow to the correct components and further balancing loads between components. As further illustrated in FIG. 2A, the metadata services 48 include a relation extraction service 50A, an entity extraction service 50B, a question and answer (QA) type extraction service 50C, a keyword extraction service 50D, a language extraction service 50E, a topic extraction service 50F, a quality extraction service 50G, a concept extraction service 50H and a category extraction service 50I.

Figure 3:
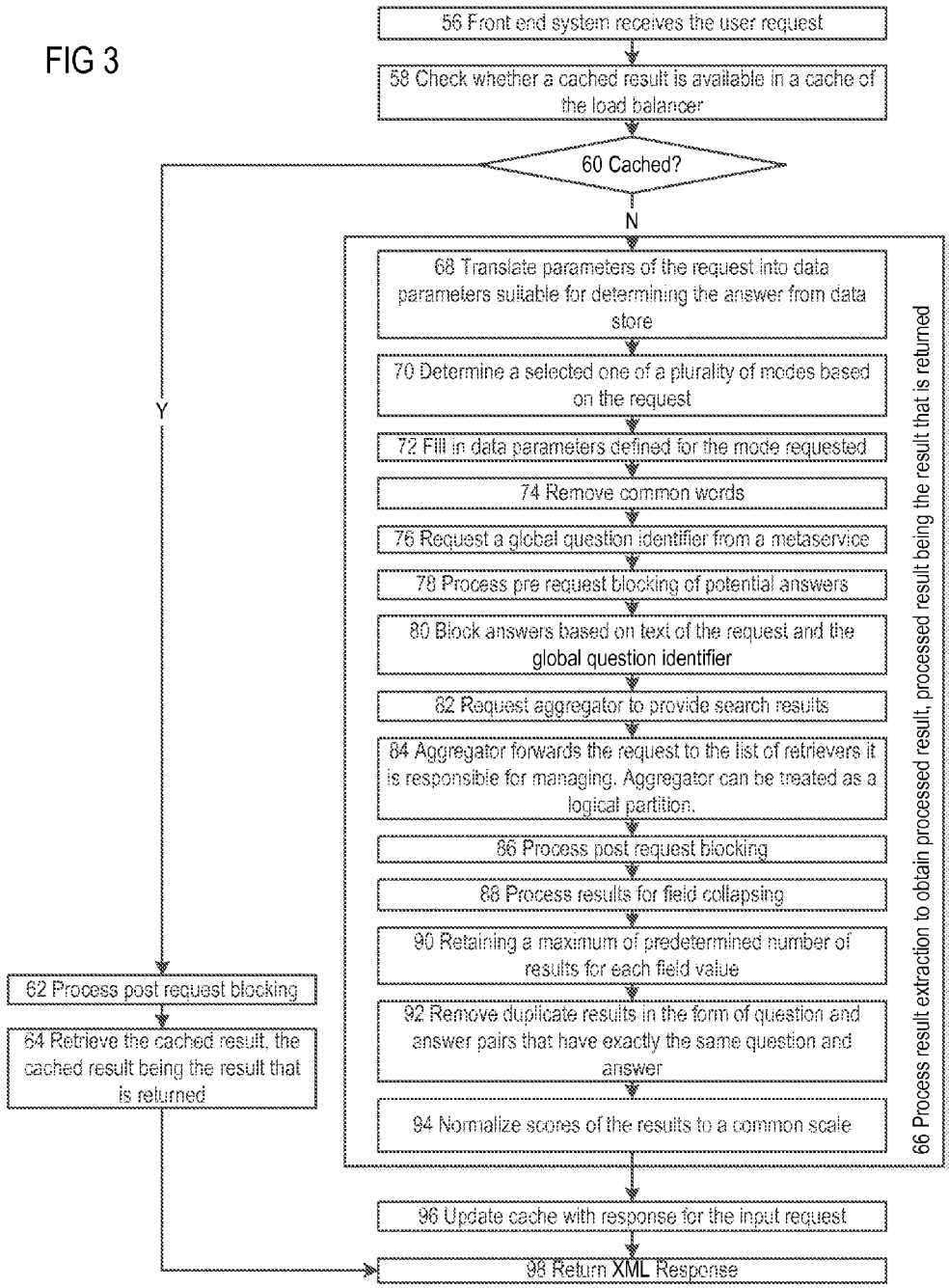
FIG. 3 is a flow chart showing functioning of the question and answer search system.

FIG. 3 illustrates the process of result extraction in more detail. At 56, the respective front end system 40 receives the request from the user. At 58, the front end system 40 checks whether a cached result is available in the cache 46 of the load balancer 38. The selected front end system 40 also checks the cache 52. At 60, the selected front end system 40 determines whether a cached result is available based on the checking at 58. If a cached result is available, then the front end system 40 proceeds to 62 by processing post request filtering. Filtering involves removal of URLs, additional metadata, checking for trendiness, etc. At 64, the selected front end system 40 retrieves the cached result, which then becomes the result that is returned to the user computer system 20.

If at 60 the selected front end system 40 determines that a cached result is not available, then the selected front end system 40 proceeds to 66 by processing result extraction to obtain a processed result. The processed result is then the result that is returned to the user computer system 20.

At 68 the selected front end system 40 translates parameters of the request into data parameters suitable for determining the answer from the data store 32. Translations involve, for example, determining request type intent, geographic location etc. of the request. At 70 the selected front end system 40 determines a selected one of a plurality of modes based on the request. At 72 the selected front end system 40 fills in data parameters defined for the selected mode. At 74 the selected front end system 40 removes common words. At 76 the selected front end system 40 requests a global question identifier from a metadata services 48. At 78 the selected front end system 40 processes pre request blocking (of potential answers), which includes removal of unwanted URLs. At 80 the selected front end system 40 blocks answers based on text of the request and the global question identifier. At 82 the selected front end system 40 requests the aggregator 42 to provide search results. At 84 the aggregator 42 in turn forwards the request to the list of retrievers 44 it is responsible for managing. The aggregator 42 can be treated as a logical partition. The retrievers 44 then return results through the aggregator 42 to the respective front end system 40. At 86 the selected front end system 40 processes post request blocking. At 88 the selected front end system 40 processes results for field collapsing. Field collapsing could include collapsing on a domain or question similarity to remove duplicates. At 90 the selected front end system 40 retains a maximum of a predetermined number of results for each field value. At 92 the selected front end system 40 removes duplicate results in the form of question and answer pairs that have exactly the same question and answer. At 94 the selected front end system 40 normalizes scores of the results to a common scale.

Following 94, the front end system 40 proceeds to 96 to update the cache 46 and the cache 52 with the processed result that is calculated at 66. At 98, the front end system 40 returns an Extensible Markup Language ("XML") response to the load balancer 38 for forwarding to the user computer system 20.

Figure 4:
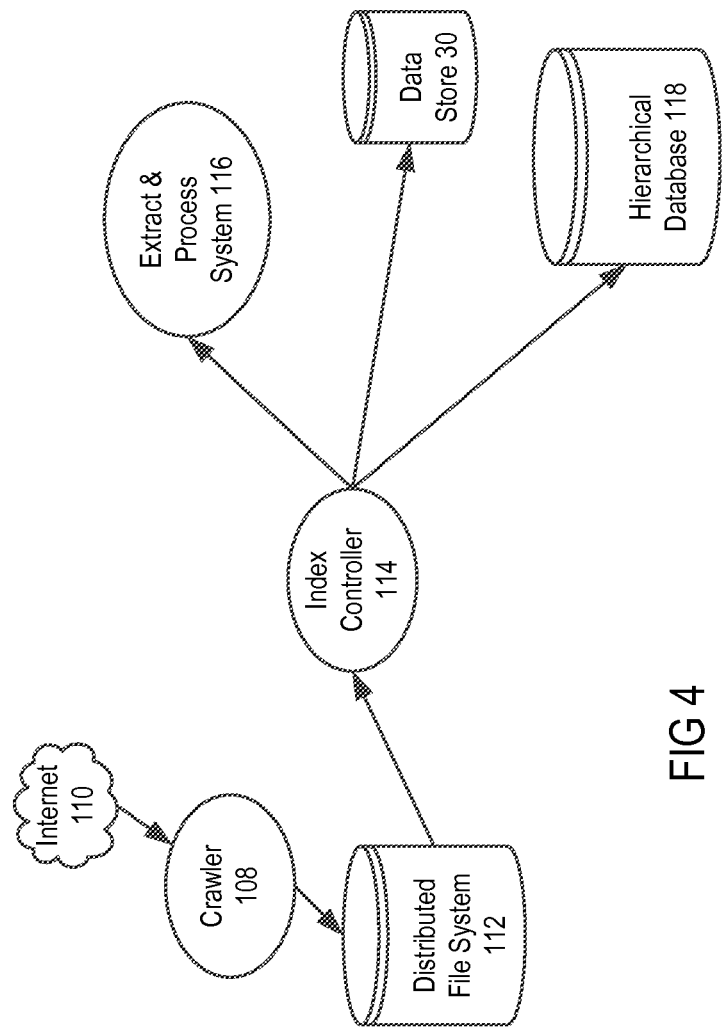
FIG. 4 is an illustrative diagram of an indexing system of the question and answer system.

FIG. 4 shows that the index system 28 includes a crawler 108 connected to the Internet 110, a distributed file system 112 connected to the crawler 108, an index controller 114 connected to the distributed file system 112, an extract and process system 116 connected to the index controller 114, a plurality of data stores 30 (only one of which is shown) connected to the index controller 114, and a hierarchical database 118 connected to the index controller 114. The crawler 108 connects over the Internet 110 to remote computer systems to retrieve data that is placed in the distributed file system 112. The extract and process system 116 is used by the index controller 114 to determine which documents to be placed in the data store 30. The index controller 114 continually updates the hierarchical database 118 with data that is stored in the data store 30.

Figure 5:
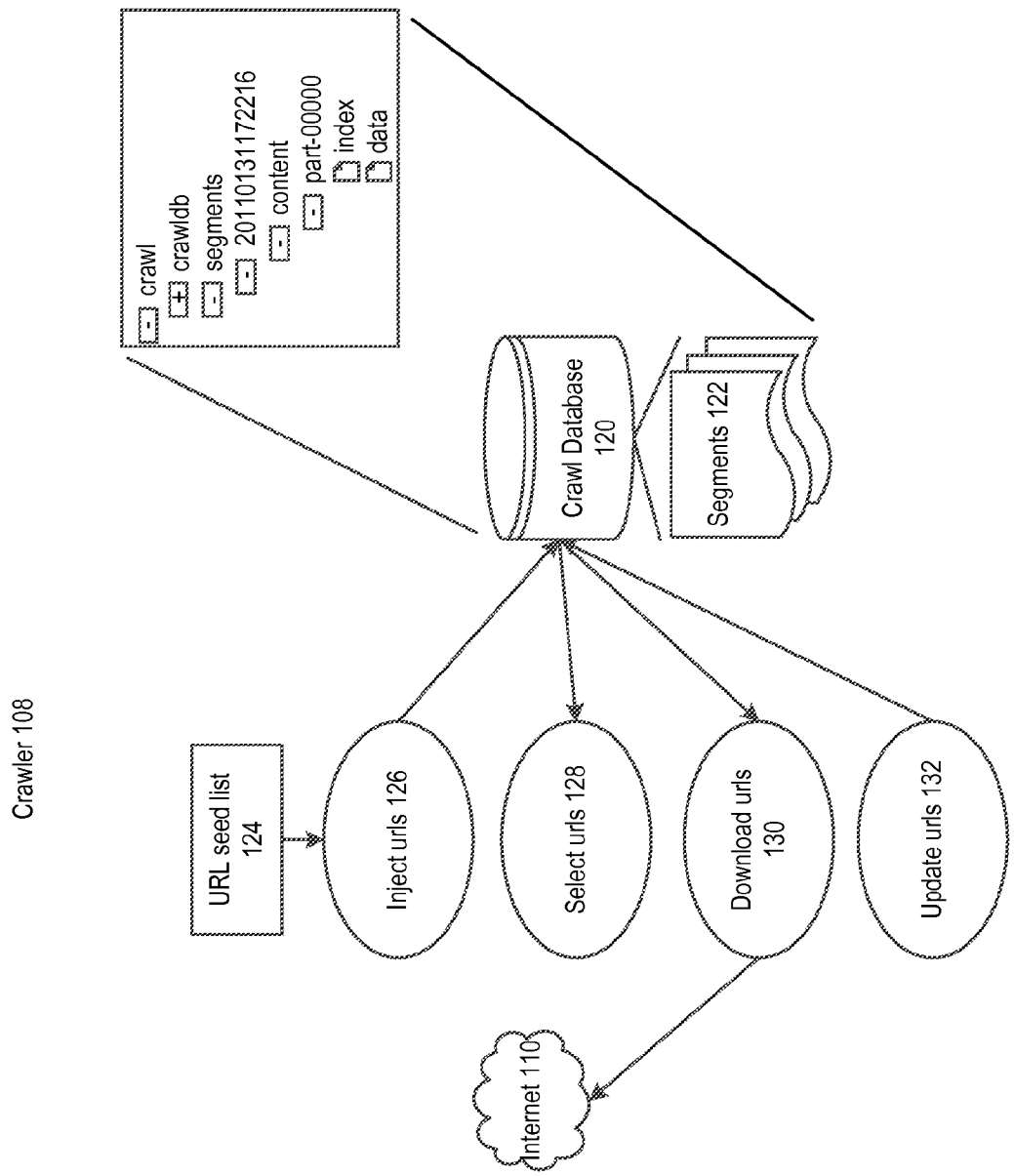
FIG. 5 is an illustrative diagram of a crawler of the indexing system.

FIG. 5 illustrates the components and functioning of the crawler 108 in more detail. The crawler 108 includes a crawl database 120 with segments 122 therein. The crawler successively executes routines 124, 126, 128, 130 and 132. At 124 the crawler 108 is programmed with a URL seed list 124 that are injected at 126 as URLs. There may for example be approximately three million URLs that is injected at 126. At 128 a selection of the URLs, for example fifty thousand URLs is made. The selection may for example be made alphabetically, based on time stamps of last download, or a combination thereof. At 130 the URLs selected at 128 are used for downloading documents over the Internet 110. The download date of each document is recorded with a time stamp. At 132 the original fifty thousand URLs are periodically updated. The updates may for example occur on a monthly basis, daily, etc. In the meantime another fifty thousand URLs are selected at 128 and the download process is repeated for the new selection of URLs.

Figure 6A:
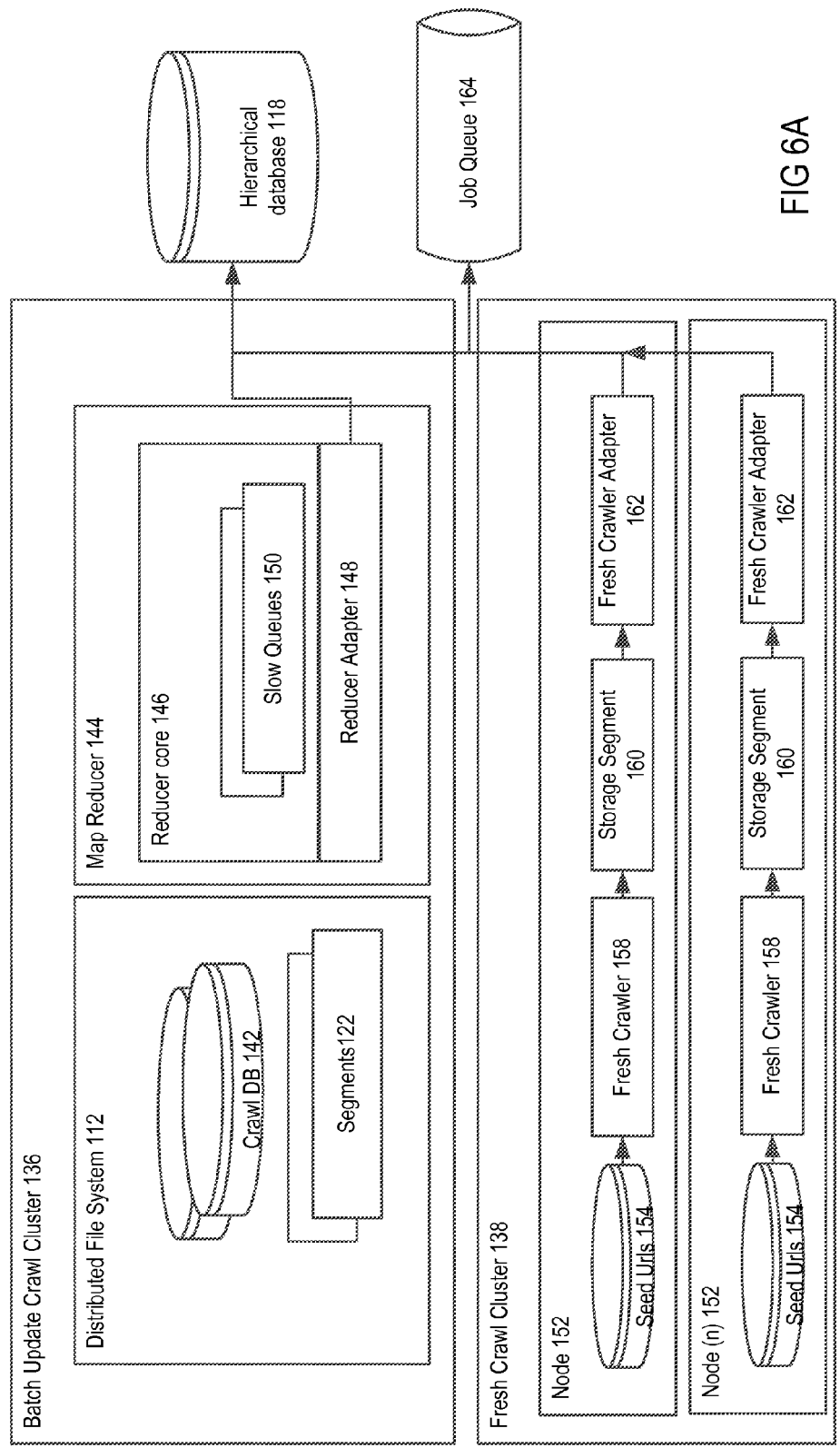
FIGS. 6A and B are block diagrams of crawl clusters forming part of the indexing system.
Figure 6B:
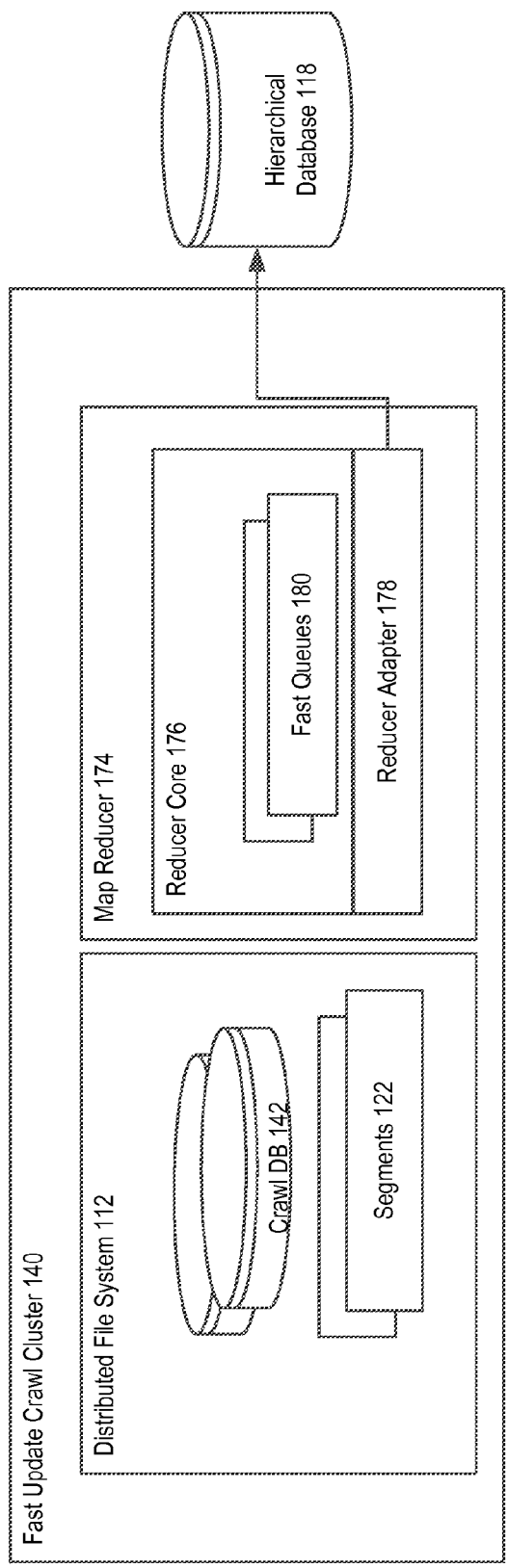

FIGS. 6A and 6B show three different crawl clusters forming part of the crawler 108, including a batch update crawl cluster 136, a fresh crawl cluster 138 and a fast update crawl cluster 140.

The batch update crawl cluster 136 includes a crawl database 142 and the segments 122 within the distributed file system 112. The batch update crawl cluster 136 further includes a map reducer 144 within the index controller 114 (FIG. 4). The map reducer 144 includes a reducer core 146 and a reducer adapter 148. The reducer core 146 has a plurality of slow queues 150. The slow queues 150 retrieve content from the crawl database 142. The reducer adapter 148 writes an output of the reducer core 146 into the hierarchical database 118.

The slow queues 150 read and record time stamps of downloads and the reducer adapter 148 records the time stamps, whether the page was dated, the status of the page, a computation of next crawl, etc. in the hierarchical database. Such reading and recording of time stamps is a slow process, but necessary if a determination has to be made when crawling has to occur again.

The fresh crawl cluster 138 has a plurality of nodes 152 that are used from rich site summary (RSS) or similar feed downloads. Each node 152 has a plurality of seed URLs 154 held in a data store, a fresh crawler 158, storage segment 160 and a fresh crawler adapter 162 connected in series to one another. The fresh crawler 158 retrieves data over the Internet 110 based on the URLs 154. The storage segment 160 stores the data retrieved by the fresh crawler 158. The fresh crawler adapter 162 writes an output of the fresh crawler placed in the storage segment 160 into the hierarchical database 118.

Similarly, a second node has a list of seed URLs 154, a fresh crawler 158 that retrieves over the Internet 110 based on the URLs 154, a storage segment 160 for storing the data retrieved by the fresh crawler 158, and a fresh crawler adapter 162 that writes an output of the fresh crawler 158 placed in the storage segment 160 into the hierarchical database 118.

The seed URLs 154 are URLs designating websites with high quality question and answer content. Certain websites for example allow users to enter questions and other users to provide answers to questions, and some websites may make use of experts to create high quality question and answer pairs.

A job queue 164 is connected to the reducer adapter 148 and fresh crawler adapters 162. The job queue 164 controls the writing of each reducer adapter 148 or 162 into the hierarchical database 118 according to a preset schedule.

The fast update crawl cluster 140 shown in FIG. 6B includes the crawl database 142 and segments 122 within the distributed file system 112. The fast update crawl cluster further includes a map reducer 174 with a reducer core 176 and a reducer adapter 178. The reducer core 176 has plurality of fast queues 180. The map reducer 174 is located within the index controller 114 (FIG. 4). The fast queues 180 retrieve content from the crawl database 142 at a faster frequency than the slow queues 150. The reducer adapter 178 writes an output of the reducer core 176 into the hierarchical database 118. The job queue 164 also controls the writing of the reducer adapter 178 into the hierarchical database 118.

The fast queues 180 do not read and record time stamps and other data of downloads and the reducer adapter 178 therefore does not record the time stamps in the hierarchical database 118. Because there is no reading and recording of time stamps and other data, the process is much faster that in the slow queues 150 of the batch update crawl cluster 136. The reducer adapter simply dumps the data retrieved by the fast queues 180 in the hierarchical database 118 without time stamps and other data. Future crawling of data dumped by the fast update crawl cluster 140 can then in further cycles be carried out by the batch update crawl cluster 136.

Figure 7:
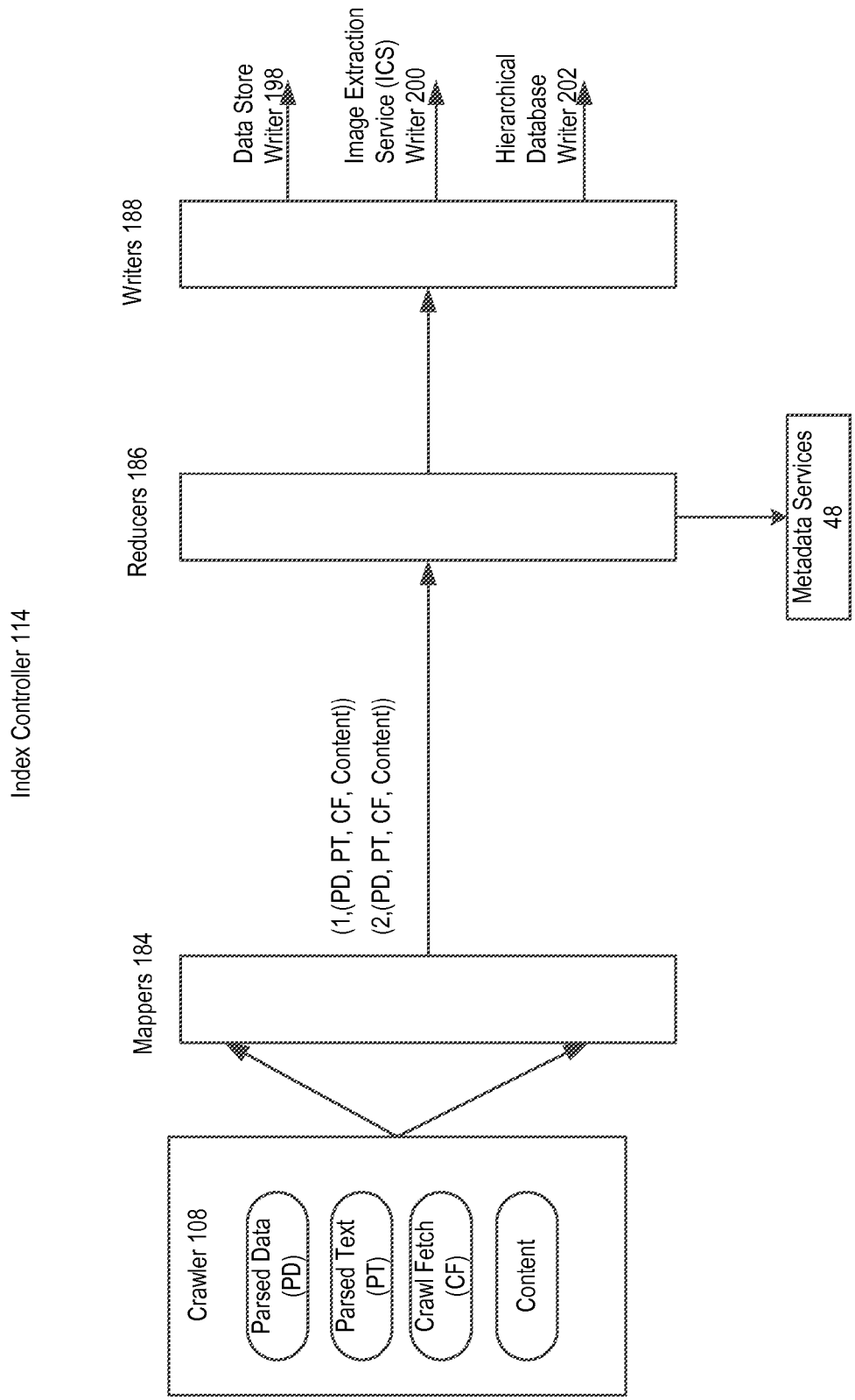
FIG. 7 is a block diagram of the crawler and an index controller forming part of the indexing system.

As shown in FIG. 7, the index controller 114 includes mappers 184, reducers 186, writers 188 and the metadata services 48. The crawler 108 retrieves parsed data (PD), parsed text (PT), crawl fetch (CF) and content. The mappers 184 send the PD, PT, CP and content to the reducers 186. The reducers 186 rely on metadata services 48 to extract concepts and data from the documents provided by the mappers 184. The writers 188 include a data store writer 198 that writes to the data stores 30 (FIG. 1), an image extraction service (ICS) writer 200 and a hierarchical database writer 202 that writes to the hierarchical database 118 (FIG. 4).

Figure 8:
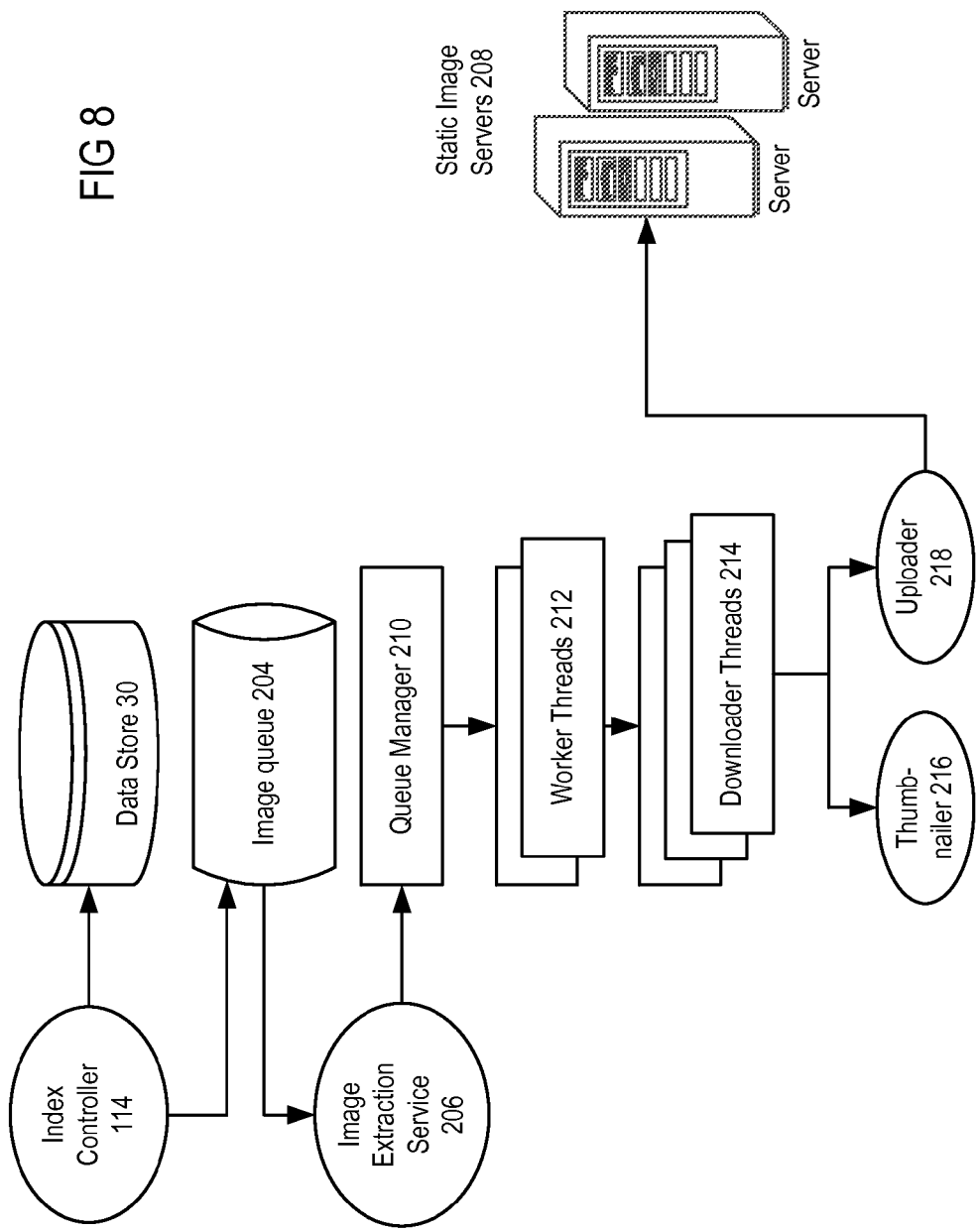
FIG. 8 is a block diagram showing components of an image extraction service forming part of the indexing system.

FIG. 8 illustrates further components of the offline system 24 (FIG. 1), including an image queue 204, an image extraction service 206 and a plurality of static image servers 208. The image extraction service 206 includes a queue manager 210, worker threads 212, downloader threads 214, a thumbnailer 216 and an uploader 218.

The image queue 204 is connected to the index controller 114. The index controller 114 updates the image queue 204 with data representing content in the data store 30 that include images. The image extraction service 206 is connected to the image queue 204. The worker threads 212 are created by the queue manager 210 based on the content of the image queue 204. The downloader threads 214 are created based on downloadable data in the worker threads 212. The worker threads 212 and downloader threads 214 are threads that have been engineered to do downloads are a predetermined time interval. Some websites will for example consider the system a "rogue" downloader if downloads occur more frequently than once every second, by way of example, unless there is an agreement that allows for more frequent downloads.

The thumbnailer 216 is connected to the downloader threads 214 and generates thumbnails of the images. The uploader 218 is also connected to the downloader threads 214. The uploader 218 uploads the thumbnails created by the thumbnailer 216 and the images from the downloader threads 214 to the static image servers 208. The images and thumbnails in the static image servers 208 can be used as part of the response to the user computer system 20 (FIG. 1).

Figure 9:
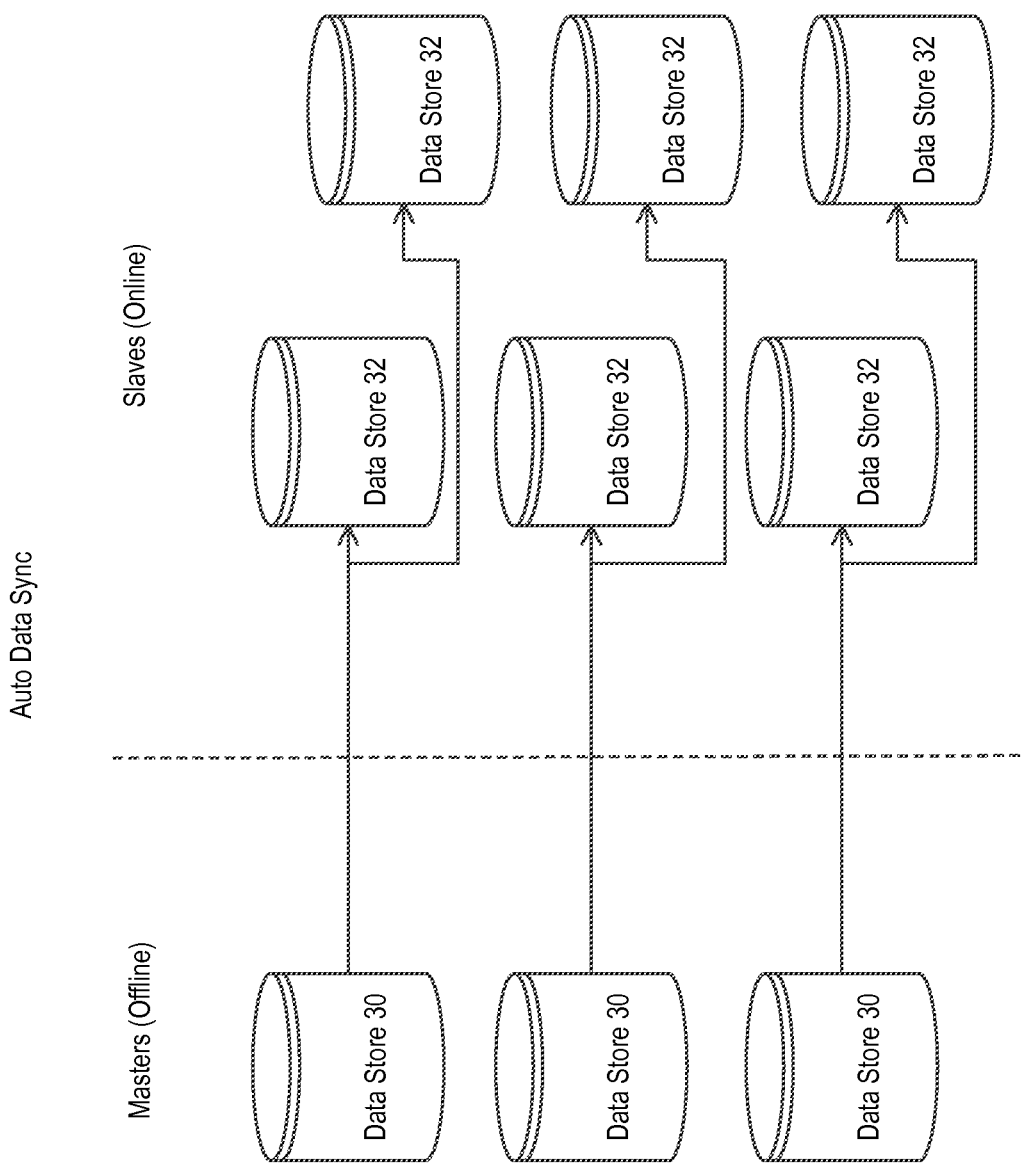
FIG. 9 is block diagram of master data stores and slave data stores of offline and online systems of the question and answer system.

FIG. 9 illustrates the data stores 30 and 32 in more detail. The data stores 30 of the offline system 24 are considered masters and the data stores 32 of the online system 26 are considered slaves. The slaves are routinely synchronized with the masters. After synchronization, the data in the data stores 32 is identical to the data in the data stores 30. Each one of the data stores 30 synchronizes to more than one of the data stores 32 in order to reduce online demand on each one of the data stores 32.

Figure 10:
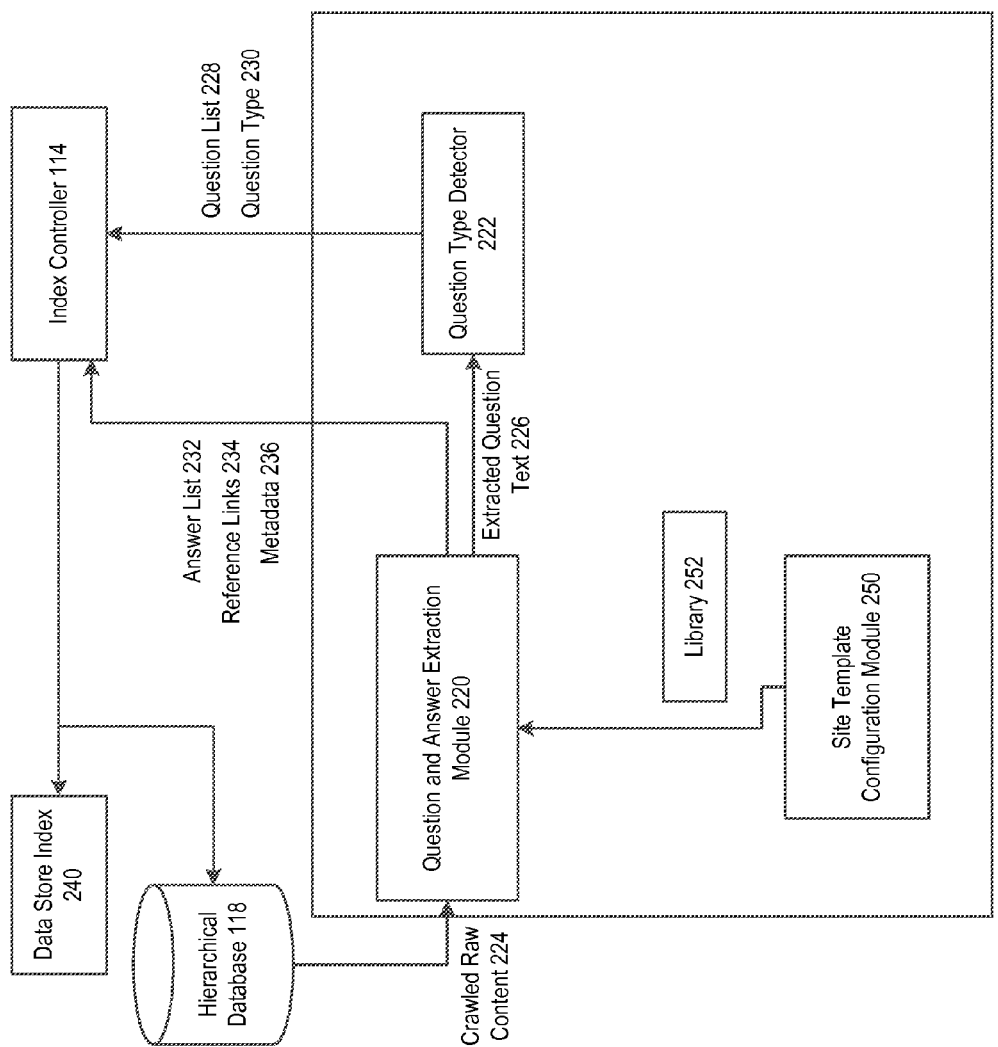
FIG. 10 is a block diagram in particular illustrating components of a question and answer extraction module and a question type detector.

FIG. 10 illustrates further components of the offline system 24 (FIG. 1), including a question and answer extraction module 220 that extracts question and answer pairs from the hierarchical database 118 and a question type detector 222 that determines a type of question for each question in the question and answer pairs. The index controller 114 indexes the question and answer pairs according to their question type.

The question and answer extraction module 220 receives crawled raw content 224 from the hierarchical database 118. The question and answer extraction module 220 forwards extracted question text 226 to the question type detector 222. The question type detector 222 determines the type of question based on the extracted question text 226. The question type detector 222 forwards a question list 228 and a question type 230 to the index controller 114. The question and answer extraction module 220 forwards an answer list 232, reference links 234 and metadata 236 to the index controller 114. The index controller 114 combines the data received from the question and answer extraction module 220 and the data received from the question type detector 222. The index controller 114 then indexes the data into the hierarchical database 118 and a data store index 240 for the data stores 30 (FIG. 1).

Figure 11:
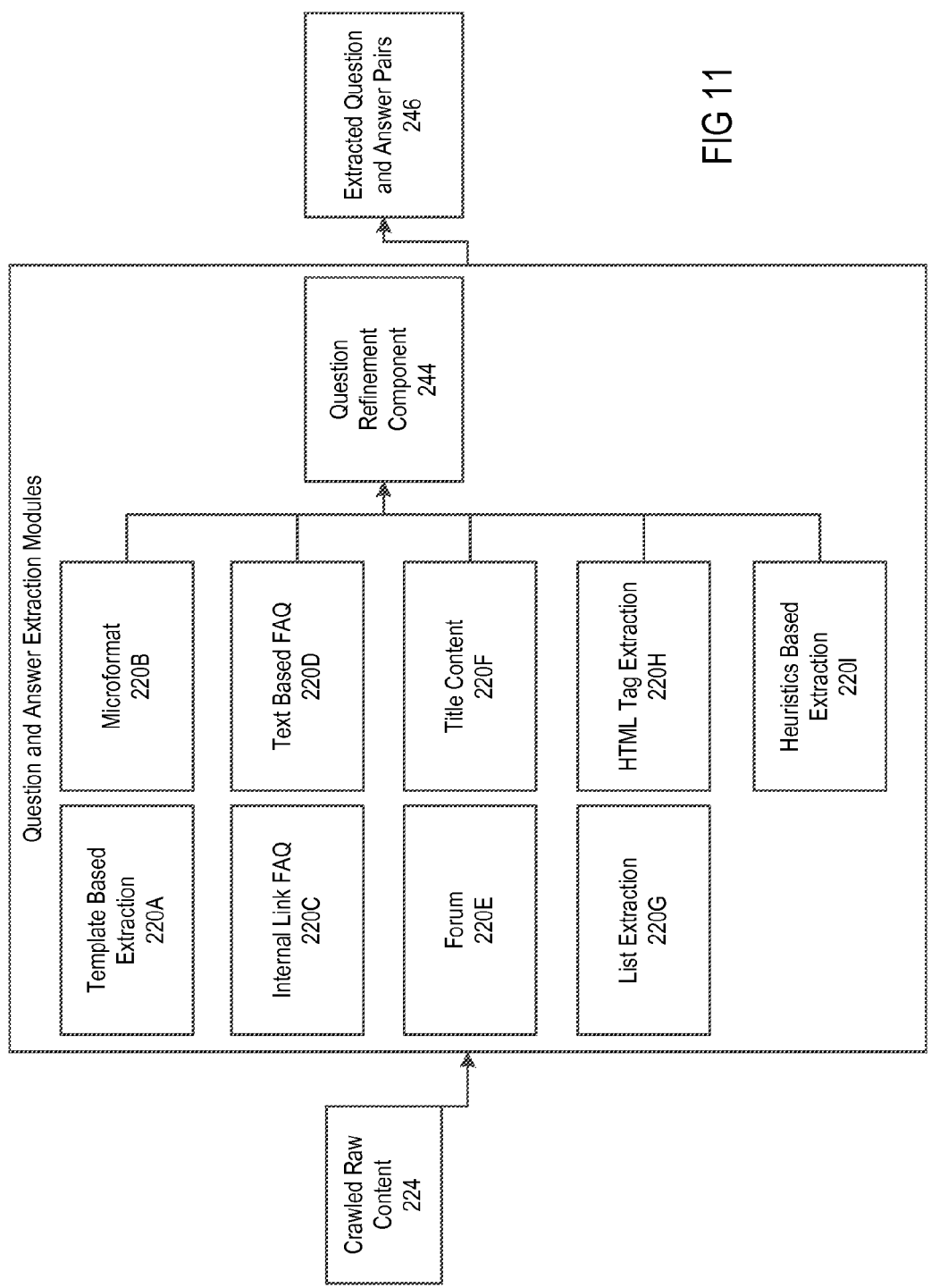
FIG. 11 is a block diagram illustrating a plurality of question and extraction modules.

FIG. 10 shows a single question and answer extraction module 220. FIG. 11 shows that there are a plurality of question and answer extraction modules 220A-I. Each question and answer extraction module 220A-I generates a respective set of question and answer pairs according to a respective methodology, the methodology being different for each question and answer extraction module.

A question refinement component 244 is connected to all the question and answer extraction modules 220A-I. The question refinement component 244 refines questions of the sets of question and answer pairs 246. The question and answer pairs 246 are created by the question refinement component 244 from the sets of question and answer pairs 246 emanating from the plurality of question and answer extraction modules 220A-I.

The question and answer extraction modules 220A-I include a template based extraction module 220A, a microformat extraction module 220B, an internal link frequently asked questions (FAQ) extraction module 220C, a text based frequently asked questions (FAQ) extraction module 220D, a forum extraction module 220E, a title content extraction module 220F, a list extraction module 220G, and an Hypertext Markup Language (HTML) tag extraction module 220H and an heuristics based extraction module 220I. The template based extraction module 220A relies on a preset template. The other question and answer extraction modules 220B-I do not rely on any preset templates.

Figure 12:
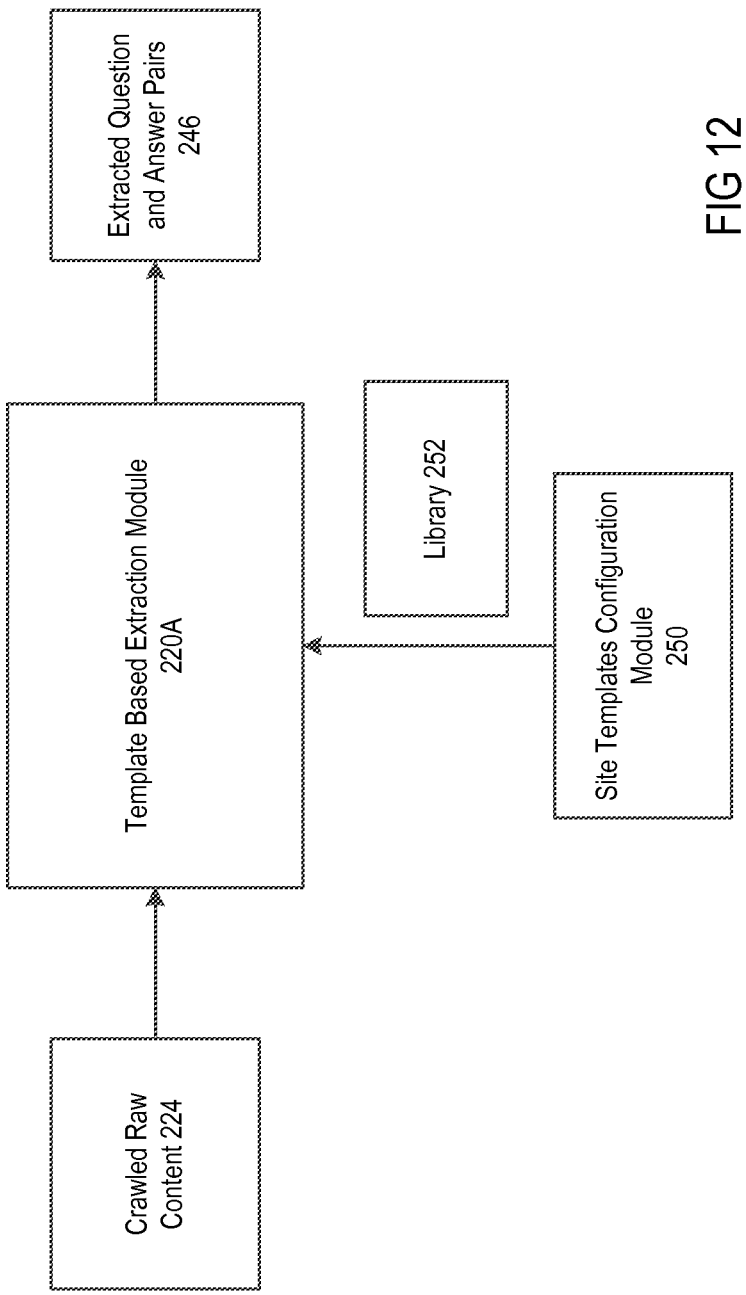
FIG. 12 is a block diagram illustrating a template based extraction module that is configurable through a site template configuration module.

FIG. 12 shows a site template configuration module 250 that is connected to the template based extraction module 220A. The site template configuration module 250 is executable by an operator to determine a configuration. A library 252 is provided and the configuration is based on the site template configuration module 250. The template based extraction module 220A uses the configuration in the library 252. The library 252 is a standard Extensible Markup Language (XML) path language (Xpath) library. The library 252 is used to navigate through and pick elements and attributes in an XML document.

Figure 13:
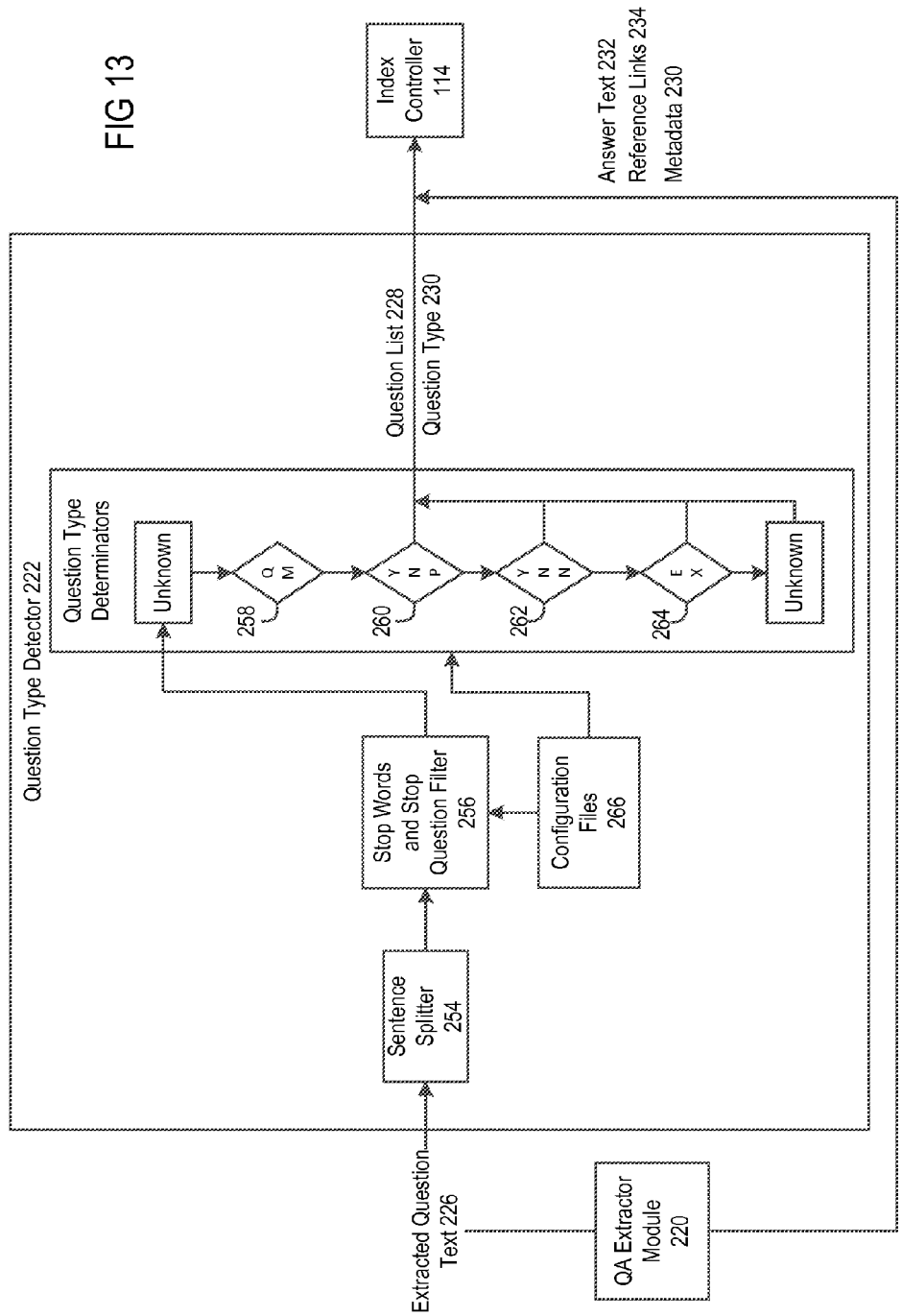
FIG. 13 is a block diagram of the question type detector.

As shown in FIG. 13, the question type detector 222 includes a sentence splitter 254, a stop words and stop question filter 256, and a plurality of question type determinators 258, 260, 262 and 264. In the case of a site template based extraction module, configuration files 266 are also provided. The sentence splitter 254 receives the extracted question text 226 of the respective question from the question and answer extraction module 220 and splits the sentence into component parts. The stop words and stop question filter 256 is connected to the sentence splitter 254. The stop words and stop question filter 256 removes stop words from the component parts and produces a question of unknown type from the component parts after the stop words have been removed. Each one of the question type determinators 258, 260, 262 and 264 is then successively challenged to determine the question type of the question of unknown type according to a separate methodology. The question type determinators include a question mark (QM) based determinator 258, a yes or no positive (YNP) question type determinator 260, a yes or no negative (YNN) question type determinator 262, and an explanatory (EX) question type determinator 264. The question type 230 is then provided with the question list 228 to the index controller 114. The index controller 114 writes the question type into the data store index 240 (FIG. 10) together with the respective question from the question list 228, as well as the answer list 232, reference links 234 and metadata 236 from the question and answer extraction module 220.

Figure 14:
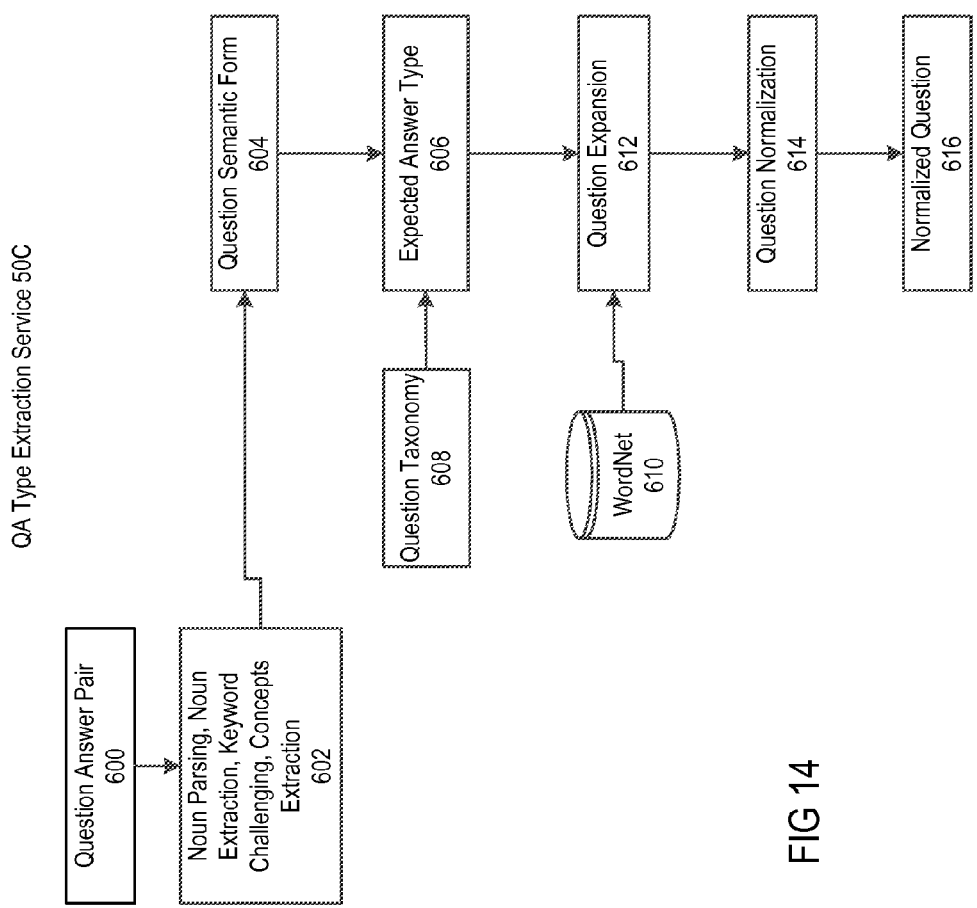
FIG. 14 is a flow chart illustrating the function of a question and answer type extraction service forming part of the metadata services.

FIG. 14 illustrates the QA type extraction service 50C in more detail. The purpose of the QA type extraction service 50C is to generate relationships between questions and answers. For example, the answer "Bill Gates is founder of Microsoft" can be analyzed in the following manner:

(Bill Gates) is founder of (Microsoft)
(<Noun>) <Verb> <Noun/Adjective> <Preposition> (<Noun>)
(Argument 1) (relation) (Argument 2)

The above analysis thus provides a relationship between two arguments. If a question is submitted "Who is the founder of Microsoft?" an analysis of the question using the QA type extraction service 50C will render the appropriate relations in order to provide the correct answer.

Question and answer pairs 600 are provided to the QA type extraction service 50C. Noun parsing, noun extraction, keyword challenging and concepts extraction are then carried out at 602. In the above example, "Bill Gates" and "Microsoft" are the nouns in the answer pair. Noun extraction involves the name entity extraction using the entity extraction service 50B in FIG. 2A. In the above example, "Bill Gates" is determined to be the name of a person and "Microsoft" is determined to be the name of an organization. Keyword challenging involves the determination of a relationship between the arguments "Bill Gates" and "Microsoft." In the above example, the keyword "founder" determines the relationship between the two arguments. Concept extraction is used to determine concepts in the question and the answer. Concept extraction is described in U.S. provisional patent application No. 61/840,781, filed on Jun. 28, 2013, which is incorporated herein by reference in its entirety.

The question in its semantic form is then rendered at 604 following the procedures carried out at 602. The expected answer type is then determined at 606 using a question taxonomy 608. An example of a question taxonomy is shown in FIG. 15. A short list of expected answer types is shown in FIG. 16.

Question expansion 612 is then carried out using a wordnet 610 located in a database. In the above example, question expansion may expand the question "Who is the founder of Microsoft?" to include other questions such as "Who founded Microsoft?" The questions emanating from the question expansion 612 then processed through a question normalization 614 to produce a normalized question 616. The normalized question is a single question based on the questions emanating from the question expansion 612 that will be readily understood by most people. The normalized question 616 can then be used together with the expected answer type 606 to determine an appropriate answer. In the above example, the normalized question may for example be "Who is founder of Microsoft?" The expected answer type 606 will include the name of a person in the place of "Who is." A more sensical answer will include "Bill Gates" to replace "Who is" as opposed to an argument that does not include the name of a person.

Figure 17:
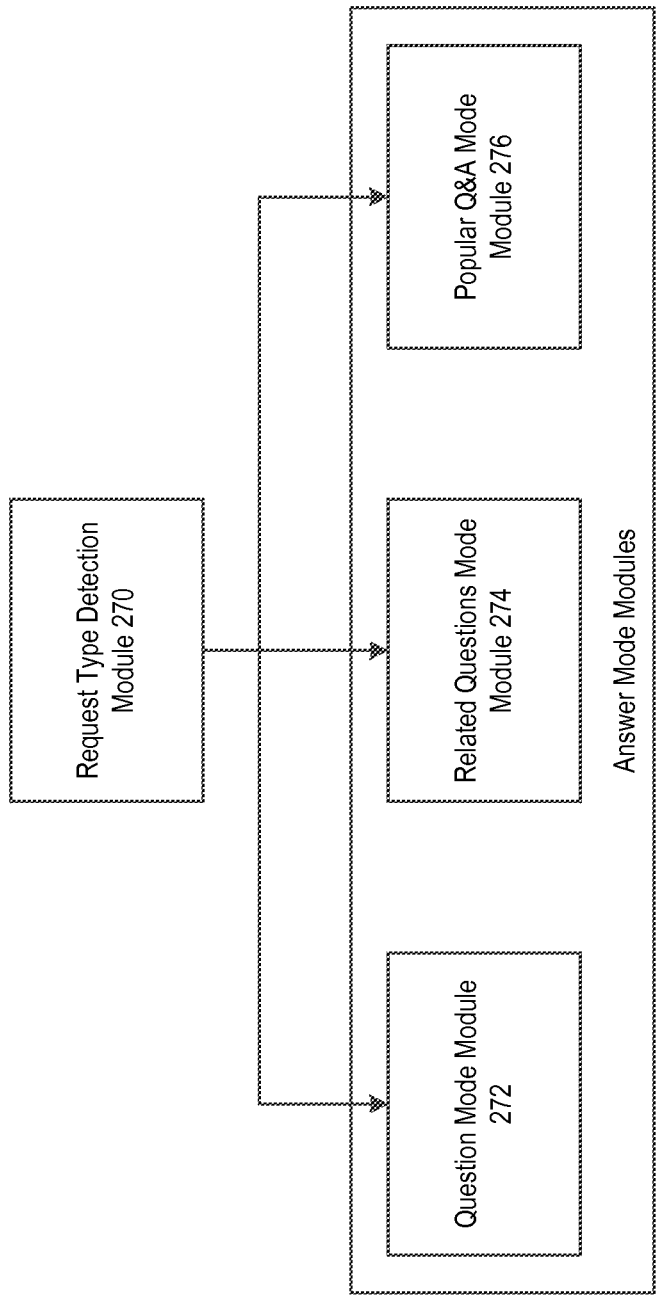
FIG. 17 is a block diagram of a request type detector and a plurality of answer mode modules that are executable based on the request type of the request type detector.

FIG. 17 is a block diagram of a request type detector 270 and a plurality of answer mode modules, including a question mode module 272, a related question mode module 274 and a popular question and answer mode module 276. One or more of the answer mode modules 272, 274 and 276 are executable based on the request type of the request type detector.

FIG. 18 shows the functioning of the question mode module 272 in more detail.

At 300 a routine is performed for checking whether the request is of type question. The remainder of FIG. 18 is not performed if the request in of non-question type.

At 302 a routine is performed for computing a global question identifier. This routine determines a global question that is the same as other questions that do not necessarily use the same language.

At 304 a routine is performed for identifying keywords by applying stemming, stop word removal and determining synonyms. Stemming involves a determination of the stem word. The stem word for "running" is "run," by way of example. Stop words are words that have little meaning, such as "the," "a," etc. Synonym identification allows for the inclusion of other words that will eventually lead to expansion of identified results.

At 306 a routine is performed for performing matching result selection by keyword extraction, exact text matching with slop 1, category matching, identified concepts matching and related topics matching. Keyword extraction involves the matching of any keywords identified at 304 with key words in the corpus of potential results. Exact text matching with slop 1 means that small differences may be allowable, such as the inclusion or exclusion of one word or if two words are in reverse order. A slop 2 matching will not be allowed, for example if there are two words that do not match. Concept identification is described in U.S. patent application No. 61/840,781 which is incorporated herein by reference. Related topics matching involves the identification of a topic of the request, finding related topics, and then finding results for the related topics.

At 308 a routine is performed for ranking the results. Each result is given a score based on the matching at 306 and the results are then ranked based on their scores.

At 310 a routine is performed for performing matching of results for question context with question context in the request. At 304 above question context words such as "how," "where," etc. are removed. The question context words are now added back to the request and matched with the results for purposes of further refining the ranking of the results.

At 318 a routine is performed for adding boosting based on host rank, freshness, identified concepts, entities and popularity. Host ranking involves the identification of host domains that are more important and ranking results from those domains higher. Freshness boosting involves the ranking of results with more recent time stamps higher than results with older time stamps. Boosting for identified concepts involves re-ranking to allow for results that belong to a concept that has been identified to appear higher. Boosting for entities involves the higher ranking of results that have good question and answer content, such as websites that specialize in question answering. Popularity boosting involves boosted ranking of results that are more frequently selected by users.

At 320 a routine is performed for preparing the result according to a display format configuration. The results are then ready for inclusion on a web page that can be returned to the user computer system 20 (FIG. 1).

FIG. 19 shows the functioning of the related question mode module 274 in more detail.

At 400 a routine is performed for checking whether the request is of type question or of non-question type. The remainder of FIG. 18 is performed if the request is of type question or of non-question type. Certain routines of FIG. 18 are however only performed if the request is of type question.

At 402 a routine is performed for computing global question identifier.

At 404 a routine is performed for identifying keywords by applying stemming, stop word removal and determining synonyms.

At 406 a routine is performed for performing matching result selection by keyword extraction, category matching, identified concepts matching and related topics matching. Exact text matching does not occur during the routine 406 for the related question mode, unlike the routine 306 in the question mode of FIG. 5.

At 408 a routine is performed for ranking the results.

At 410, if the request is of type question, then a routine is performed for matching of results for question context with question context in the request and demoting the results with same question context. This routine is skipped if the request is of non-question type. As opposed to the routine 310 of the question mode in FIG. 5 where question context matching results in a higher ranking, at 410 of the related question mode question context matching results in a lower ranking in order to favor relatedness.

At 412 a routine is performed for referring to a knowledge graph to apply relatedness scores of the results. The knowledge graph assists in determining how related questions are. Results that are more related are favored over results that are less related.

At 414 a routine is performed for ranking the results based on question types that include WH (What, Where, How).YNP (Yes/No). EX (Explanatory). QM (Question mark) and OT (others) in that order. The determination of the question type has been described with reference to FIG. 13.

At 418 a routine is performed for adding boosting based on host rank, freshness, identified concepts, entities and popularity.

At 420 a routine is performed for preparing the result according to a display format configuration.

FIG. 20 shows the functioning of the popular question and answer mode module 276 in more detail.

At 500 a routine is performed for checking whether the request is of type question or of non-question type.

At 502 a routine is performed for computing global question identifier.

At 504 a routine is performed for identifying keywords by applying stemming, stop word removal and determining synonyms.

At 506 a routine is performed for performing matching result selection by keyword extraction, category matching, identified concepts matching and related topics matching.

At 508 a routine is performed for ranking the results.

At 510, if the request is of type question, then a routine is performed for matching of results for question context with question context in the request and demoting the results with same question context.

At 512 a routine is performed for referring to a knowledge graph to apply relatedness scores of the results.

At 516 a routine is performed for merging or boosting trendy content based on trendiness scores of the content. Trendy content is content that has become available recently but that was unavailable in the more distant past. Trendy content can also be content that has become more available recently than in the more distant past. Trendy content can also be content that has become more popular recently than in the more distant past. The trendiness score of the content dominates the ranking of the results.

At 518 a routine is performed for adding boosting based on host rank, freshness, identified concepts, entities and popularity.

Figure 21:
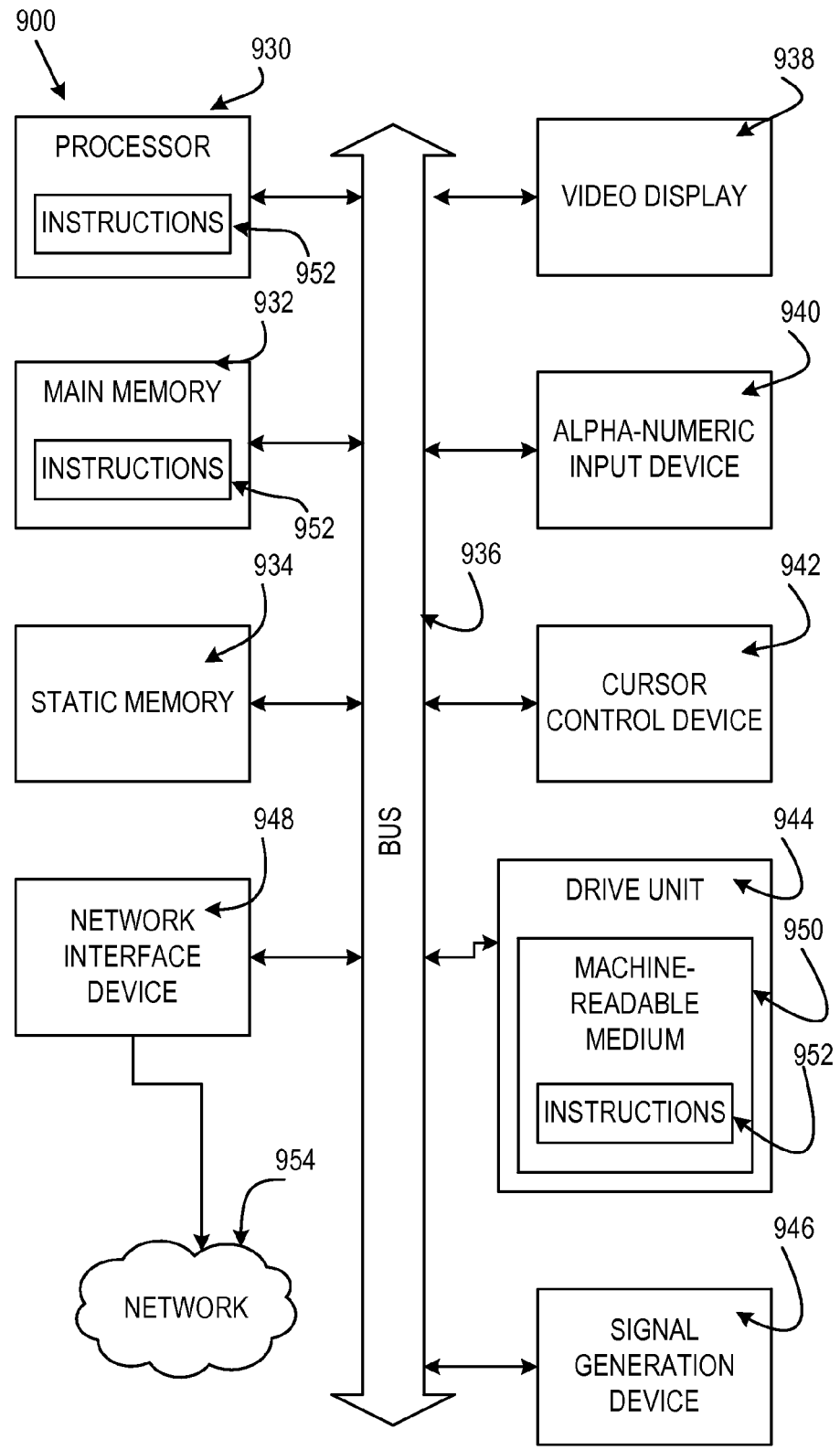
FIG. 21 is a block diagram of a machine in the form of a computer system forming part of the question and answer system for providing results to requests from a user computer system.

At 520 a routine is performed for preparing the result according to a display format configuration FIG. 21 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM, etc.), which communicate with each other via a bus 936.

The computer system 900 may further include a video display 938 (e.g., a liquid crystal display (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the memory 932 and the processor 930 also constituting machine readable media. The software may further be transmitted or received over a network 954 via the network interface device 948.

While the instructions 952 are shown in an exemplary embodiment to be on a single medium, the term "machine-readable medium" should be taken to understand a single medium or multiple media (e.g., a centralized or distributed database or data source and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A question and answer system for providing results to requests comprising:
    an online system that includes:
        at least one data store;
        a question and answer search engine that receives a request from a user computer system, determines a result from the data store based on the request and returns the answer to the user computer system; and
    an offline system that includes:
        a file system;
        a hierarchical database; and
        an index controller having:
            at least one reducer that retrieves content from the file system; and
            at least one writer that maintains the data store with the content retrieved by the reducer, and maintains the hierarchical database with data reflecting the content in the data store;
        an image queue, the index controller updating the image queue with data representing content in the data store that include images;
        an image extraction service having:
            a queue manager;
            worker threads that are created by the queue manager based on the content in the image queue;
            downloader threads that are created based on downloadable data in the worker threads, wherein the worker threads and downloader threads download images at a predetermined interval;
            a thumbnailer generating thumbnails for the images;
            an uploader; and at least one static image server, the uploader uploading the thumbnails and images to the static image server.

2. A method for providing results to requests comprising:

receiving, with a question and answer search engine of an online system, a request from a user computer system;

determining, with the question and answer search engine, a result from a data store of the online system based on the request and returns the answer to the user computer system;

returning, with the question and answer search engine, the answer to the user computer system;

retrieving, with at least one reducer of an index controller of an offline system, content from a file system of the offline system;

maintaining, with at least one writer of the index controller, the data store with the content retrieved by the reducer, and the hierarchical database with data reflecting the content in the data store;

updating, with the index controller, an image queue of the offline system with data representing content in the data store that include images;

creating, with a queue manager of an image extraction service forming part of the offline system, worker threads based on the content in the image queue; and creating downloader threads based on downloadable data in the worker threads;

downloading with the worker threads and downloader threads images at a predetermined interval;

generating, with a thumbnailer of the image extraction service, thumbnails for the images; and uploading, with an uploader of the image extraction service, at least one static image server the thumbnails and images to at least one static image server.

3. The system of claim 1, wherein the offline system includes:

at least one data store, the writer of the index controller writing to the data store of the offline system and the data store of the online system synchronizing with the data store of the offline system.

4. The system of claim 1, wherein the offline system includes:

a question and answer extraction module extracting question and answer pairs from the hierarchical database; and a question type detector determining a type of question for each question in the question and answer pairs, wherein the index controller indexes question and answer pairs based on the question type, the index controller combines data received from the question and answer extraction module and data received from the question type detector.

5. The method of claim 2, further comprising:

writing, with the writer of the index controller, data to at least one data store of the offline system; and synchronizing the data store of the online system with the data store of the offline system.

6. The method of claim 2, further comprising:

extracting, with a question and answer extraction module forming part of the offline system, question and answer pairs from the hierarchical database; and determining, with a question type detector forming part of the offline system, a type of question for each question in the question and answer pairs, wherein the index controller indexes question and answer pairs based on the question type; and combining, with the index controller, data received from the question and answer extraction module and data received from the question type detector.

7. The system of claim 4, further comprising:

a plurality of question and answer extraction modules, each generating a respective set of question and answer pairs according to a respective methodology the methodology being different for each question and answer extraction module; and a question refinement component refining questions of the sets of question and answer pairs, the question and answer pairs being created by the question refinement component from the sets of question and answer pairs from the plurality of question and answer modules.

8. The system of claim 4, further comprising:

a request type determinator determining a type of the request; and a plurality of answer mode modules that are executed based on the request type.

9. The method of claim 6, further comprising:

generating, with each of a plurality of question and answer extraction modules, question and answer pairs according to a respective methodology, the methodology being different for each question and answer extraction module; and refining, with a question refinement component, questions of the sets of question and answer pairs, the question and answer pairs being created by the question refinement component from the sets of question and answer pairs from the plurality of question and answer modules.

10. The method of claim 6, further comprising:

determining, with a request type detection module, a type of the request; and executing one or more of a plurality of answer mode modules based on the request type.

* * * * *